US008718725B2

(12) United States Patent
Kemppinen

(10) Patent No.: US 8,718,725 B2
(45) Date of Patent: May 6, 2014

(54) METHOD AND APPARATUS FOR DOUBLE SLIDER DEVICE WITH TILTING DISPLAY

(75) Inventor: Pasi Kemppinen, Tampere (FI)

(73) Assignee: Nokia Corporation, Espoo (FI)

(*) Notice: Subject to any disclaimer, the term of this patent is extended or adjusted under 35 U.S.C. 154(b) by 766 days.

(21) Appl. No.: 12/800,064

(22) Filed: May 7, 2010

(65) Prior Publication Data
US 2011/0275422 A1 Nov. 10, 2011

(51) Int. Cl.
*H04M 1/00* (2006.01)
(52) U.S. Cl.
USPC .............. 455/575.4; 455/575.1; 455/90.3; 455/550.1; 455/566; 455/90.2; 379/433.1; 379/428.01; 379/433.11; 379/433.12; D14/137; D14/138 AD; D14/138 AB
(58) Field of Classification Search
USPC ........... 455/575.4, 575.1, 90.3, 566, 550.1, 455/90.2, 422.1, 403; 379/433.1, 428.01, 379/433.11, 433.12; D14/137, 138 AD, D14/138 AB
See application file for complete search history.

(56) References Cited

U.S. PATENT DOCUMENTS

| 7,225,002 B2* | 5/2007 | Lee et al. .................... 455/575.4 |
| 7,690,576 B2* | 4/2010 | Ladouceur et al. ............ 235/486 |
| 7,986,983 B2* | 7/2011 | Harmon et al. ............. 455/575.4 |
| 8,073,502 B2* | 12/2011 | Malthe et al. .............. 455/575.1 |
| 8,265,719 B2* | 9/2012 | Lindvall ..................... 455/575.4 |
| 2002/0077161 A1 | 6/2002 | Eromaki ....................... 455/575 |
| 2003/0125081 A1* | 7/2003 | Boesen .......................... 455/556 |
| 2008/0304215 A1 | 12/2008 | Chiu ............................ 361/681 |
| 2009/0168369 A1 | 7/2009 | Barnett ......................... 361/727 |
| 2010/0087232 A1* | 4/2010 | Yeh et al. ................... 455/575.4 |

FOREIGN PATENT DOCUMENTS

| EP | 2 012 506 A2 | 1/2009 |
| JP | 2006186577 A | 7/2006 |
| TW | 286019 B | 8/2007 |
| WO | WO 2008/056019 A1 | 5/2008 |

OTHER PUBLICATIONS

"HTC TyTN Product Sheet", http://www.htc.com/uploadedFiles/Common/Product_Documents/UK/1766_TyTN_PRODSHT_FRNT.pdf, 1 pg.
"Nokia N97 Tech Specs", http://www.nokiausa.com/find-products/phones/nokia-n97/specifications, 7 pg, Mar. 25, 2010.
"Method and Apparatus for Flat and Tilt Slide Mechanism", Rolf G. Laido, et al., U.S. Appl. No. 12/767,196, filed Apr. 26, 2010, 46 pgs.

\* cited by examiner

*Primary Examiner* — Keith Ferguson
(74) *Attorney, Agent, or Firm* — Harrington & Smith

(57) ABSTRACT

In accordance with an example embodiment of the present invention, an apparatus is disclosed. The apparatus includes a housing, a first hinge member, and a second hinge member. The housing includes a first housing section and a second housing section. The first hinge member is connected to the first housing section by a first slide mechanism. The second hinge member includes a first portion and a second portion. The first portion is connected to the first hinge member. The second portion is connected to the second housing section by a second slide mechanism.

20 Claims, 26 Drawing Sheets

400

```
┌─────────────────────────────────────────────────────────────┐
│   PROVIDING A HOUSING HAVING A FIRST HOUSING SECTION AND A  │
│                   SECOND HOUSING SECTION                     │
└─────────────────────────────────────────────────────────────┘
                                                          —402

┌─────────────────────────────────────────────────────────────┐
│    CONNECTING A HINGE ASSEMBLY BETWEEN THE FIRST            │
│      HOUSING SECTION AND THE SECOND HOUSING SECTION         │
└─────────────────────────────────────────────────────────────┘
                                                          —404

┌─────────────────────────────────────────────────────────────┐
│   CONNECTING A FIRST SLIDE MECHANISM BETWEEN THE FIRST      │
│           HINGE MEMBER AND FIRST HOUSING SECTION            │
└─────────────────────────────────────────────────────────────┘
                                                          —406

┌─────────────────────────────────────────────────────────────┐
│     CONNECTING A SECOND SLIDE MECHANISM BETWEEN THE         │
│    SECOND HINGE MEMBER AND THE SECOND HOUSING SECTION       │
└─────────────────────────────────────────────────────────────┘
                                                          —408
```

FIG.47

METHOD AND APPARATUS FOR DOUBLE SLIDER DEVICE WITH TILTING DISPLAY

TECHNICAL FIELD

The invention relates to generally to an apparatus with a double slider configuration and tilting display, and an associated method.

BACKGROUND

As electronic devices continue to become more sophisticated, these devices provide an increasing amount of functionality by including such applications as, for example, a mobile phone, digital camera, video camera, navigation system, gaming capabilities, and internet browser applications. Many of these devices with increased functionality have more than one configuration. Electronic devices having slidable housing members, such as a slide phone for example, proving multiple configurations are known in the art. As consumers demand increased functionality from electronic devices, there is a need to provide improved devices having increased capabilities while maintaining robust and reliable product configurations. Accordingly, there is a need to provide an improved electronic device slide mechanism.

SUMMARY

Various aspects of examples of the invention are set out in the claims.

According to a first aspect of the present invention, an apparatus is disclosed. The apparatus includes a housing, a first hinge member, and a second hinge member. The housing includes a first housing section and a second housing section. The first hinge member is connected to the first housing section by a first slide mechanism. The second hinge member includes a first portion and a second portion. The first portion is connected to the first hinge member. The second portion is connected to the second housing section by a second slide mechanism.

According to a second aspect of the present invention, an apparatus is disclosed. The apparatus includes a first housing section, a second housing section, and a dual slider tilt assembly. The first housing section includes a top end and an opposite bottom end. The second housing section is connected to the first housing section. The second housing section includes a top end and an opposite bottom end. The dual slider tilt assembly is connected between the first housing section and the second housing section. The dual slider tilt assembly is configured to permit a substantially translational movement of the second housing section over the entire first housing section from a closed position to a fully extended position. The bottom end of the second housing section is spaced from the top end of the first housing section in the direction of the substantially translational movement when the second housing section is at the fully extended position. The dual slider tilt assembly is configured to permit tilting the second housing section towards the first housing section when the second housing section is at the fully extended position.

According to a third aspect of the present invention, a method is disclosed. A housing having a first housing section and a second housing section is provided. A hinge assembly is connected between the first housing section and the second housing section. The hinge assembly includes a first hinge member and a second hinge member. A first slide mechanism is connected between the first hinge member and first housing section. A second slide mechanism is connected between the second hinge member and the second housing section.

BRIEF DESCRIPTION OF THE DRAWINGS

For a more complete understanding of example embodiments of the present invention, reference is now made to the following descriptions taken in connection with the accompanying drawings in which:

FIG. 47 is a block diagram of an exemplary method incorporating features of the invention.

DETAILED DESCRIPTION OF THE DRAWINGS

An example embodiment of the present invention and its potential advantages are understood by referring to FIGS. 1 through 48 of the drawings.

Figure 1:
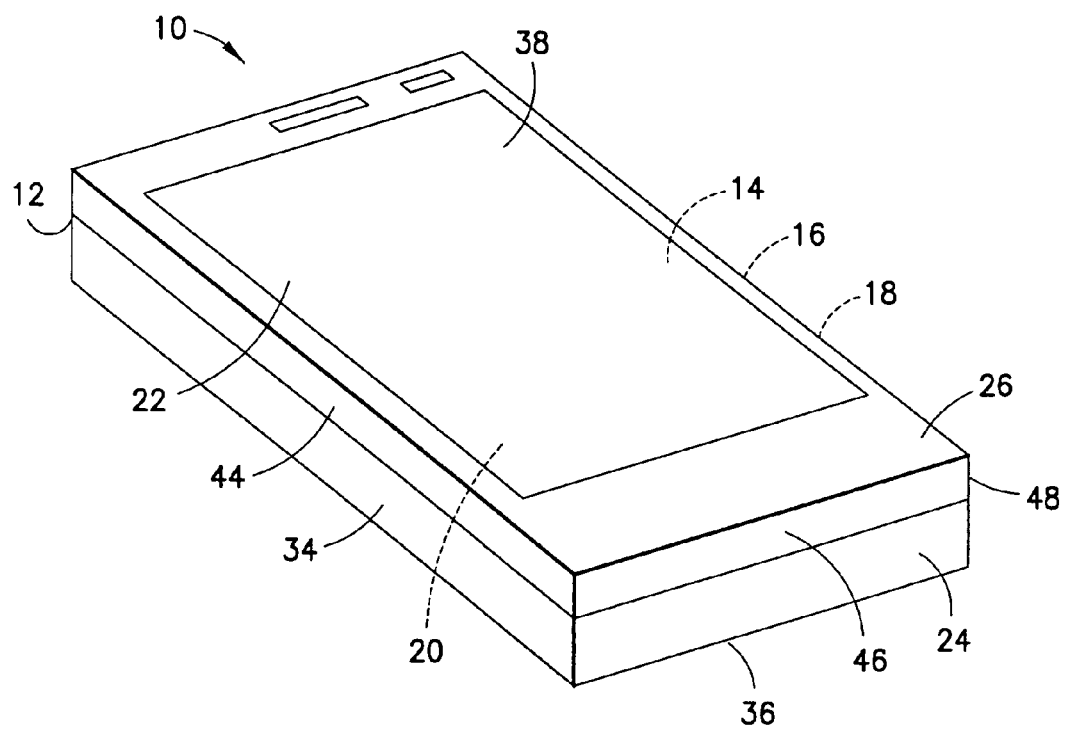
FIG. 1 is a perspective view of an electronic device incorporating features of the invention.

Referring to FIG. 1, there is shown a perspective view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. The housing 12 comprises a lower housing section 24 and an upper housing section 26. It should be noted that in alternate embodiments, more than two housing sections may be provided. Additionally, in alternate embodiments, the device 10 can have any suitable type of features as known in the art.

Figure 2:
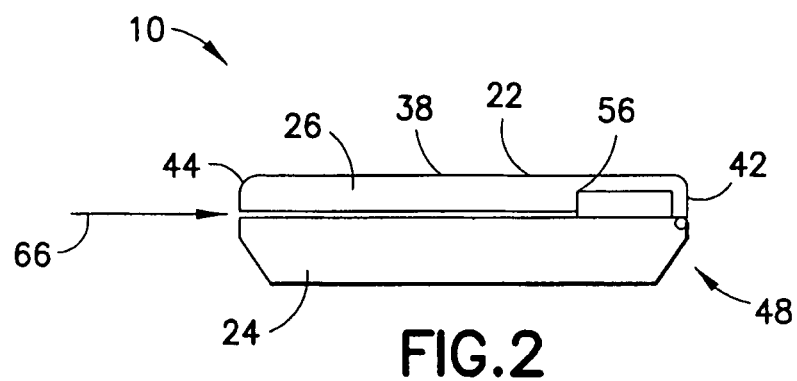
FIG. 2 is a partial section view of the electronic device shown in FIG. 1.
Figure 3:
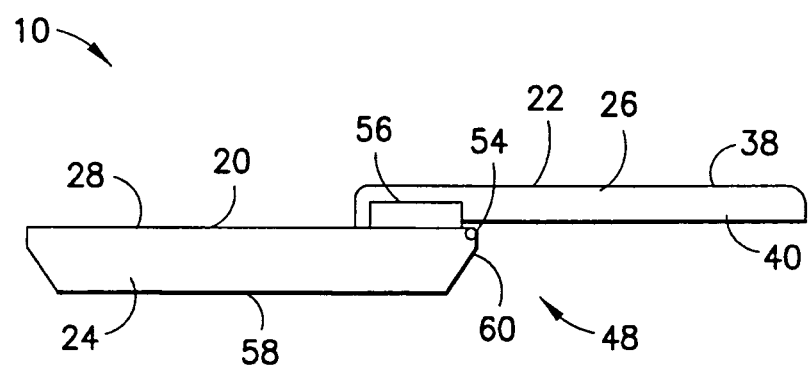
FIG. 3 is a partial section view of the electronic device shown in FIG. 1 in a first open position.
Figure 4:
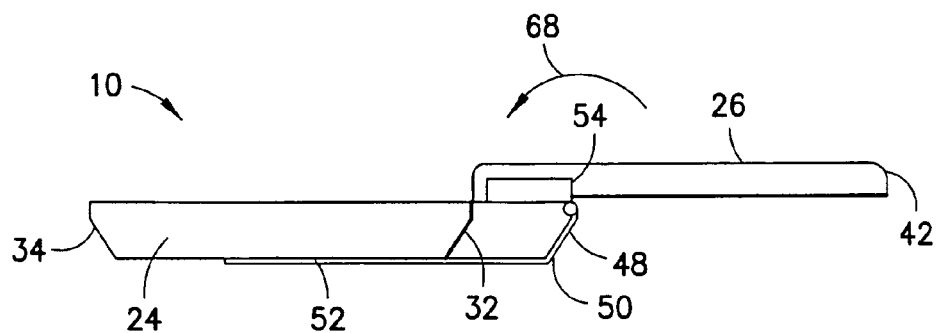
FIG. 4 is a partial section view of the electronic device shown in FIG. 1 in a fully extended position.
Figure 5:
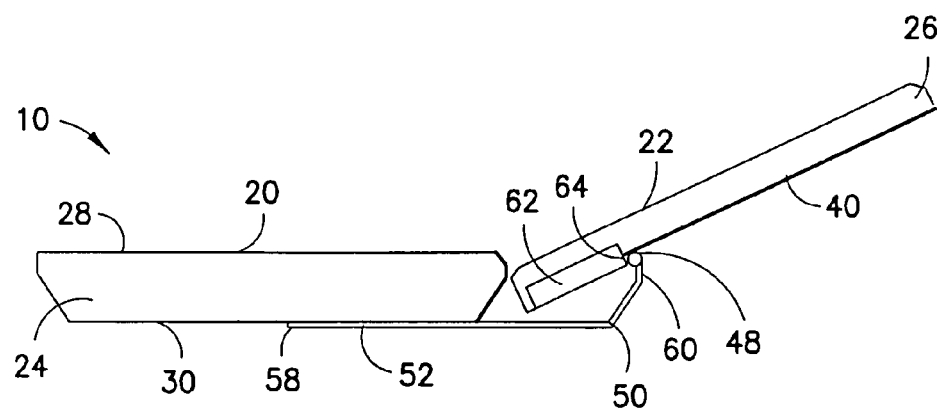
FIG. 5 is a partial section view of the electronic device shown in FIG. 1 in a tilted position.
Figure 6:
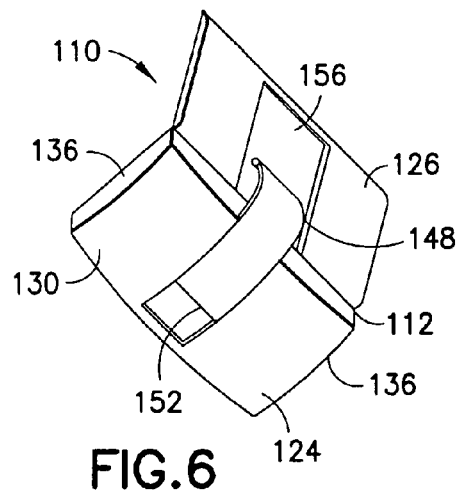
FIG. 6 is a perspective view of another electronic device incorporating features of the invention.
Figure 7:
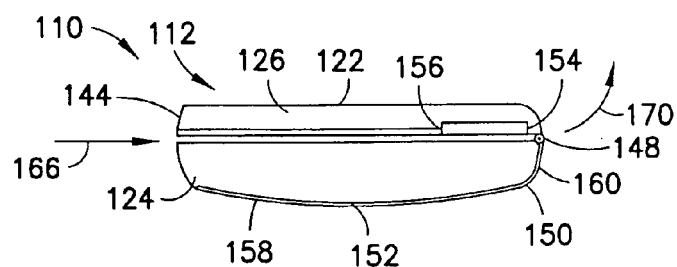
FIG. 7 is a partial section view of the electronic device shown in FIG. 6 in a closed position.

Referring now also to FIGS. 2-5, the lower housing section 24 and the upper housing section 26 are movably connected to each other. In particular, the upper housing section 26 is movably connected to the lower housing section 24 between a closed position as shown in FIGS. 1, 2, a first open position as shown in FIG. 3, a fully extended position as shown in FIG. 4, and a tilted position as shown in FIG. 5.

The lower housing section 24 comprises an upper face 28 and an opposite lower face 30. According to some examples of the invention, the lower housing section 24 comprises the user input region 20 at the upper face 28. In alternate embodiments, a display (such as a touch screen display, for example) may be provided at the upper face 28. However, it should be noted that any suitable configuration having a user input region and/or a display at the upper face 28 may be provided. The upper face 28 is substantially covered by the upper housing section 26 when the device 10 is in the closed position. When the device 10 is in the first open position, a portion of the upper face 28 forms a portion of a front face of the device 10. When the device 10 is in the fully extended position and the tilted position, the entire upper face forms a portion (such as about half, or about fifty percent, for example) of the front face of the device 10. The lower face 30 forms the back face of the device 10 when the device 10 is in the closed position. The lower face 30 forms a portion of the back face of the device 10 when the device 10 is in the first open, fully extended, and tilted positions (such as about half, or about fifty percent, of the back face, for example, when the device is in the fully extended or tilted position). Additionally, the lower housing section 24 comprises a top end 32, a bottom end 34, and lateral sides 36 between the upper face 28 and the lower face 30. According to various exemplary embodiments of the invention, the upper and lower faces 28, 30 each comprise a substantially flat (or planar) configuration. However, in alternate example embodiments, any suitable surface shape/configuration may be provided.

The upper housing section 26 comprises an upper face 38 and an opposite lower face 40. According to some examples of the invention, the upper housing section 26 comprises the display 22 at the upper face 38. In alternate embodiments, a user input region may be provided at the upper face 38. However, it should be noted that any suitable configuration having a user input region and/or a display (such as a touch screen display, for example) at the upper face may be provided.

The upper face 38 forms the front face of the device 10 when the device 10 is in the closed position (or closed configuration). The upper face 38 forms a portion of the front face of the device 10 when the device 10 is in the first open position (or first open configuration). The entire upper face 38 forms a portion (such as about half, or about fifty percent, for example) of the front face of the device 10 when the device 10 is in the fully extended position (or fully extended configuration) and the tilted position (or tilted configuration). The lower face 40 is substantially covered by the lower housing section 24 when the device 10 is in the closed position. When the device 10 is in the first open position, a portion of the lower face 40 forms a portion of the back face of the device 10. When the device 10 is in the fully extended position and the tilted position, the entire lower face 40 forms a portion (such as about half, or about fifty percent, for example) of the back face of the device 10. Additionally, the upper housing section 26 comprises a top end 42, a bottom end 44, and lateral sides 46 between the upper face 38 and the lower face 40. According to various exemplary embodiments of the invention, the upper and lower faces 38, 40 each comprise a substantially flat (or planar) configuration. However, in alternate example embodiments, any suitable surface shape/configuration may be provided.

The lower housing section 24 and the upper housing section 26 are connected to each other by a dual slider tilt assembly 48. The dual slider tilt assembly comprises a lower hinge member 50, a lower slide mechanism 52, an upper hinge member 54, and an upper slide mechanism 56.

The lower hinge member 50 comprises a first end 58 and a second end 60. The first end 58 is suitably sized and shaped to extend over at least a portion of the lower face 30 of the lower housing section 24. The second end 60 is suitably sized and shaped to extend over the top end 32 of the lower housing section 24. The lower hinge member 50 may further comprise a one-piece member fabricated from any suitable material. According to various exemplary embodiments of the invention, a substantial majority of the first end 58 comprises a substantially flat (or planar) configuration. However, in alternate example embodiments, any suitable shape/configuration may be provided.

The lower slide mechanism 52 is connected between the lower hinge member 50 and the lower housing section 24. The lower slide mechanism 52 provides a slidable connection between the lower hinge member 50 and the lower housing 24. According to various exemplary embodiments of the invention, the slide mechanism 52 may comprise a slide plate attached to the lower hinge member 50, a slide element attached to the lower housing section 24 and movably mounted to the slide plate, and a spring member between the slide plate and the slide element. However, any suitable type of slide mechanism may be provided between the lower hinge member 50 and the lower housing section 24. Additionally, according to some embodiments of the invention, a portion of the slide mechanism may be integrally formed with the lower hinge member and/or the lower housing section.

The upper hinge member 54 comprises a first end and a second end 64. The first end 62 is suitably sized and shaped to extend over at least a portion of the lower face 40 of the upper housing section 26. The second end 64 is pivotably connected to the second end 60 of the lower hinge member 50. The pivotable connection may be provided in any suitable fashion, such as by a hinge pin configuration, for example. The upper hinge member 54 may further comprise a one-piece member fabricated from any suitable material.

The upper slide mechanism 56 is connected between the upper hinge member 54 and the upper housing section 26. The upper slide mechanism 56 provides a slidable connection between the upper hinge member 54 and the upper housing section 26. According to various exemplary embodiments of the invention, the slide mechanism 56 may comprise a slide plate attached to the upper housing section 26, a slide element attached to the upper hinge member 54 and movably mounted to the slide plate, and a spring member between the slide plate and the slide element. However, any suitable type of slide mechanism may be provided between the upper hinge member and the upper housing section 26. Additionally, according to some embodiments of the invention, a portion of the slide mechanism may be integrally formed with the lower hinge member and/or the lower housing section.

To change the configuration of the device 10 from the closed position (see FIG. 2) to the first open position (see FIG. 3), a user may manipulate the device by sliding the upper housing section 26 relative to the upper hinge member 54, which may be accomplished by pushing the bottom end 44 of the upper housing section 26 in a direction 66 towards the top end 42 of the lower housing section 24. The slide mechanism 56 is configured to provide substantially translational (or linear) motion in the direction 66 (along a plane parallel to the upper face 28 of the lower housing section 24). According to some embodiments of the invention, the movement of the upper housing member 26 from the closed position to the first open position may be provided solely by the upper slide mechanism 56, however, in alternate embodiments any suitable configuration may be provided.

To change the configuration of the device 10 from the first open position (See FIG. 3) to the fully extended position (see FIG. 4), a user may manipulate the device by sliding the upper housing section 26 relative to the upper hinge member 54, which may be accomplished by further pushing of the bottom end 44 of the upper housing section 26 in the direction 66 towards the top end 32 of the lower housing section 24, such that the bottom end 44 of the upper housing section 26 moves beyond the top end 32 of the lower housing section 24 (in the direction 66). This movement of the upper housing section 26 to the fully extended position provides for the entire upper face 28 of the lower housing section 24 to be revealed (and accessible). The slide mechanism 52 is configured to provide substantially translational (or linear) motion in the direction 66 (along the plane parallel to the upper face 28 of the lower housing section 24) when the upper housing section 26 is moved from the first open position to the fully extended position. According to some embodiments of the invention, the movement of the upper housing section 26 from the first open position to the fully extended position may be provided solely by the lower slide mechanism 52. For example, pushing of the upper housing section 26 (from the first open position) causes relative movement between the lower hinge member 50 and the lower housing section 24 at the lower slide mechanism 52, such that the lower hinge member 50 and the upper hinge member 54 slide away from the top end 32 of the lower housing section 24 (see FIG. 4). However, in alternate embodiments any suitable configuration may be provided.

To change the configuration of the device 10 from the fully extended position (See FIG. 4) to the tilted position (see FIG. 5), a user may manipulate the device 10 by tilting (in a direction 68) the upper housing section 26 towards the lower housing section 24. This may be accomplished by pivoting of the upper hinge member 54 relative to the lower hinge member 50 (in response to the tilting of the upper housing section 26). The dual slide tilt assembly 48 is configured to allow the top end 32 of the lower housing section 24 to be in contact with the bottom end 44 of the upper housing section 26 when the device 10 is in the tilted configuration (see FIG. 5). Additionally, in this tilted position/configuration an edge of the upper surface 38 of the upper housing section 26 is adjacent an edge of the upper surface 28 of the lower housing section 24. According to some embodiments of the invention, a spring member may be provided between the upper hinge member 54 and the lower hinge member 50 such that the upper housing section 26 automatically tilts when the upper housing section 26 is in the fully extended position. However, any suitable configuration may be provided. The dual slider tilt assembly 48 is configured to provide substantially rotational (or pivoting) motion in the direction 68 between the upper hinge member 54 and the lower hinge member 50 when the upper housing section 26 is moved from the fully extended position to the tilted position.

It should be noted that the dual slider tilt assembly 48 may comprise any suitable width (such as a width dimension in a direction extending between the lateral sides 36, 46 of the device 10). According to one example embodiment, the assembly 48 may comprise a substantially narrow width (relative to the width of the device 10), which may provide for ease of use, as this provides increased surface area at the lower housing 24 for manipulation by a user's finger. According to another example embodiment, the assembly 48 may comprise a wider configuration, or even a cover configuration that covers substantially the entire lower housing section 24 (with the exception of the bottom end 34 of the lower housing section 24, as this may impede movement of the cover in the sliding direction).

According to various exemplary embodiments of the invention, the dual slide tilt assembly 48 provides two sliding mechanisms and a tilt hinge such that the device forms a double slider communicator with a tilting display configuration. Technical effects of any one or more of the exemplary embodiments of the invention provide for a full size QWERTY style keyboard to be included at the user input region of the lower housing section, while also providing an adjustable display viewing angle.

While various embodiments of the invention have been described above in connection with the lower face of the lower housing section comprising a substantially flat planar surface, one skilled in the art will appreciate that the invention is not necessarily so limited and that other suitable lower face surface shapes may be provided. For example, and referring now also to FIGS. 6-8, there are shown views of a device 110 in accordance with another embodiment of the invention. The device 110 is similar to the device 10 and similar features are similarly numbered. Additionally, references made to a similarly numbered feature, such as the display 122 for example, include any previous descriptions provided for the other similarly numbered feature, such as the display 22 for example.

Similar to the device 10, the device 110 comprises a housing 112 having a lower housing section 124, an upper housing section 126 and a dual slider tilt assembly 148 connected between the lower housing section 124 and the upper housing section 126. However, in this embodiment the lower face 130 of the lower housing section 124 and a portion of the dual slider tilt assembly 148 each comprise a curved configuration.

Similar to the lower housing section 24, the lower housing section 124 comprises an upper face 128 and the opposite lower face 130. Additionally, the lower housing section 124 comprises a top end 132, a bottom end 134, and lateral sides 136 between the upper face 128 and the lower face 130. In this example embodiment, the lower face 130 comprises a generally curved surface extending between the top end 132 and the bottom end 134. However, in other embodiments, any suitable surface shape configuration may be provided. According to some examples of the invention, the lower housing section 124 comprises the user input region 120 at the upper face 128. In alternate embodiments, a display (such as a touch screen display, for example) may be provided at the upper face 128. However, it should be noted that any suitable configuration having a user input region and/or a display at the upper face 128 may be provided. The upper face 128 is substantially covered by the upper housing section 126 when the device 110 is in the closed position. When the device 110 is in the first open position, a portion of the upper face 128 forms a portion of a front face of the device 110. When the device 110 is in the fully extended position and the tilted position, the entire upper face 128 forms a portion (such as about half, or about fifty percent, for example) of the front face of the device 110. The lower face 130 forms the back face of the device 110 when the device 110 is in the closed position. The lower face 130 forms a portion of the back face of the device 110 when the device 110 is in the first open, fully extended, and tilted positions (such as about half, or about fifty percent, of the back face, for example, when the device 110 is in the fully extended or tilted position).

Similar to the device 10, the dual slider tilt assembly 148 comprises a lower hinge member 150, a lower slide mechanism 152, an upper hinge member 154, and an upper slide mechanism 156.

The lower hinge member 150 comprises a first end 158 and a second end 160. The first end 158 is suitably sized and shaped to extend over at least a portion of the lower face 130 of the lower housing section 124. The second end 160 is suitably sized and shaped to extend over the top end 132 of the lower housing section 124. The lower hinge member 150 may further comprise a one-piece member fabricated from any suitable material. According to various exemplary embodiments of the invention, the first end 158 comprises a generally curved surface which corresponds with the curved surface of the lower housing section 124. However, in alternate example embodiments, any suitable surface shape/configuration may be provided.

The lower slide mechanism 152 is connected between the lower hinge member 150 and the lower housing section 124. The lower slide mechanism 152 provides a slidable connection between the lower hinge member 150 and the lower housing 124. According to various exemplary embodiments of the invention, the slide mechanism 152 may comprise a slide plate attached to the lower hinge member 150, a slide element attached to the lower housing section 124 and movably mounted to the slide plate, and a spring member between the slide plate and the slide element. However, any suitable type of slide mechanism may be provided between the lower hinge member 150 and the lower housing section 124. Additionally, according to some embodiments of the invention, a portion of the slide mechanism may be integrally formed with the lower hinge member and/or the lower housing section. According to various exemplary embodiments of the invention, the slide plate and the slide element each comprise a generally curved surface which corresponds with the curved surfaces of the lower housing section 124 and the lower hinge member 150. However, in alternate example embodiments, any suitable surface shape/configuration may be provided.

The upper housing section 126, the upper hinge member 154, and the upper slide mechanism 156 are similarly configured as the upper housing section 26, the upper hinge member 54, and the upper slide mechanism 56, and are similarly connected to the lower hinge member 150 as described above for the device 10.

To change the configuration of the device 110 from the closed position (see FIG. 7) to the first open position, a user may manipulate the device by sliding the upper housing section 126 relative to the upper hinge member 154 (in a similar fashion as described above for the device 10) wherein, for example, the movement of the upper housing member 126 from the closed position to the first open position may be provided solely by the upper slide mechanism 156, however, in alternate embodiments any suitable configuration may be provided.

To change the configuration of the device 110 from the first open position to the fully extended position, the user may manipulate the device 110 by sliding the upper housing section 126 relative to the upper hinge member 154, which may be accomplished by further pushing of the bottom end 144 of the upper housing section 126 in a direction 166 towards the top end 132 of the lower housing section 124, such that the bottom end 144 of the upper housing section 126 moves beyond the top end 132 of the lower housing section 124 (in the direction 166). This movement of the upper housing section 124 to the fully extended position provides for the entire upper face 128 of the lower housing section 124 to be revealed (and accessible). However, in this example embodiment, due to the generally curved configuration of the lower housing section 124 the slide mechanism 152 is configured to provide substantially curvilinear motion (of the hinge members 150, 154 resulting in a tilting of the upper housing section 126 relative to the lower housing section 124) in the direction 170 when the upper housing section 126 is moved from the first open position to the fully extended position. According to some embodiments of the invention, the movement of the upper housing section 126 from the first open position to the fully extended position may be provided solely by the lower slide mechanism 152. For example, pushing of the upper housing section 126 (from the first open position) causes relative movement between the lower hinge member 150 and the lower housing section 124 at the lower slide mechanism 152, such that the lower hinge member 150 and the upper hinge member 154 slide away (in the direction 170) from the top end 132 of the lower housing section 124. However, in alternate embodiments any suitable configuration may be provided.

To change the configuration of the device 110 from the fully extended position to the tilted position (see FIGS. 6, 8), the user may manipulate the device by tilting the upper housing section 126 towards the lower housing section 124. Similar to the device 10, this may be accomplished by pivoting of the upper hinge member 154 relative to the lower hinge member 150 (in response to the tilting of the upper housing section 126). However, in this example embodiment the curved configuration of the lower housing member 124, lower hinge member 150, and lower slide mechanism 152, provides an increased tilting angle as the hinge axis point moves upwards (for example see distance 172) in response to the movement from the first open position to the fully extended position.

Figure 8:
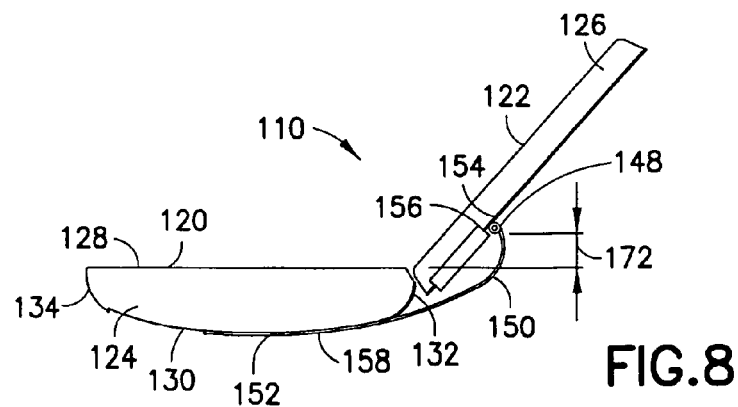
FIG. 8 is a partial section view of the electronic device shown in FIG. 6 in a tilted position.
Figure 9:
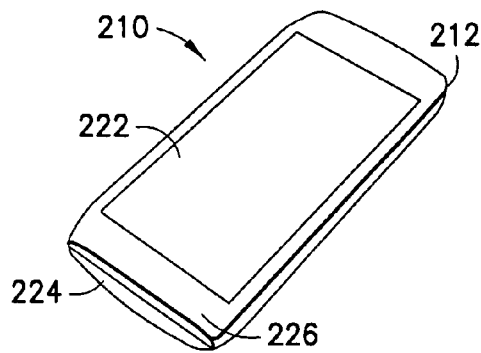
FIG. 9 is a perspective view of another electronic device incorporating features of the invention.
Figure 10:
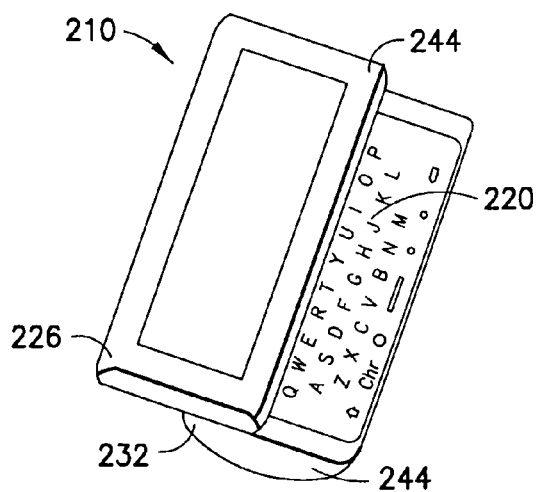
FIG. 10 is a perspective view of the electronic device shown in FIG. 9 in a first open position.
Figure 11:
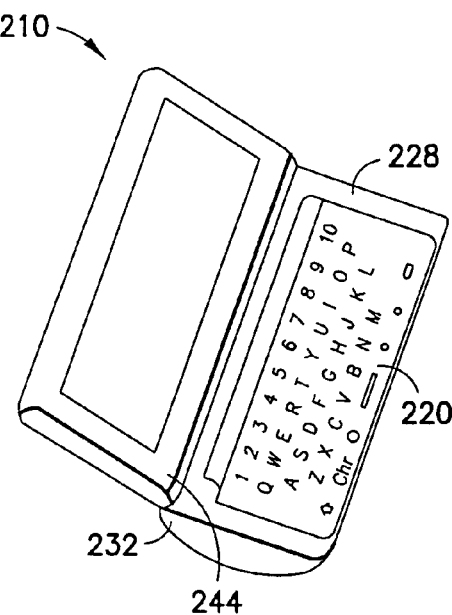
FIG. 11 is a perspective view of the electronic device shown in FIG. 9 in a tilted position.
Figure 12:
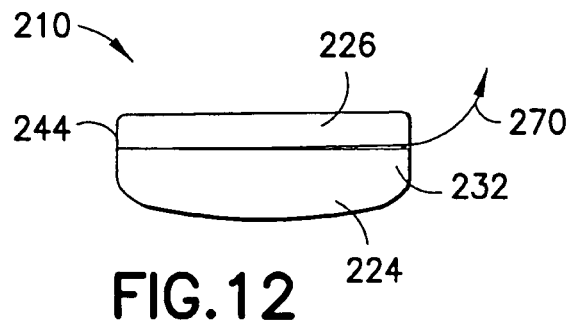
FIG. 12 is a side view of the electronic device shown in FIG. 9 in a closed position.
Figure 13:
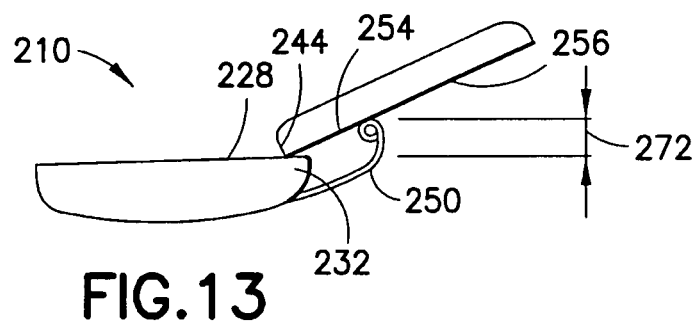
FIG. 13 is a side view of the electronic device shown in FIG. 9 in a tilted position.
Figure 14:
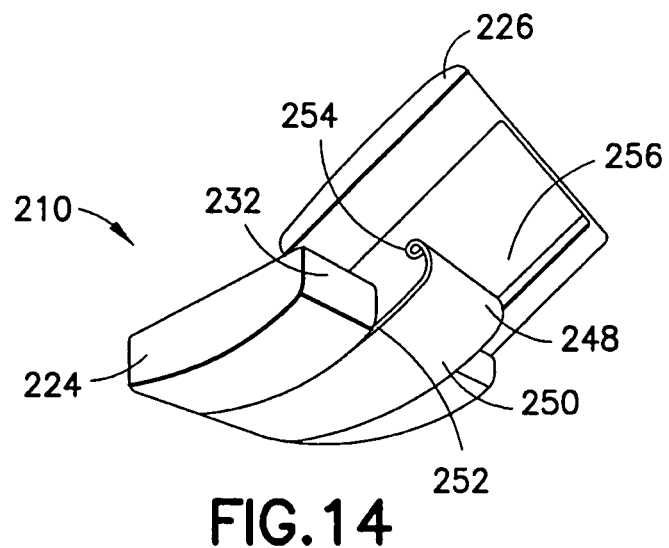
FIG. 14 is another perspective view of the electronic device shown in FIG. 9 in a tilted position.
Figure 15:
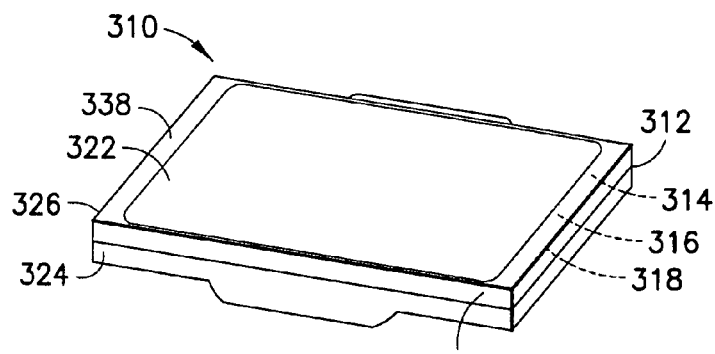
FIGS. 15-17 are perspective views of another electronic device incorporating features of the invention.
Figure 16:
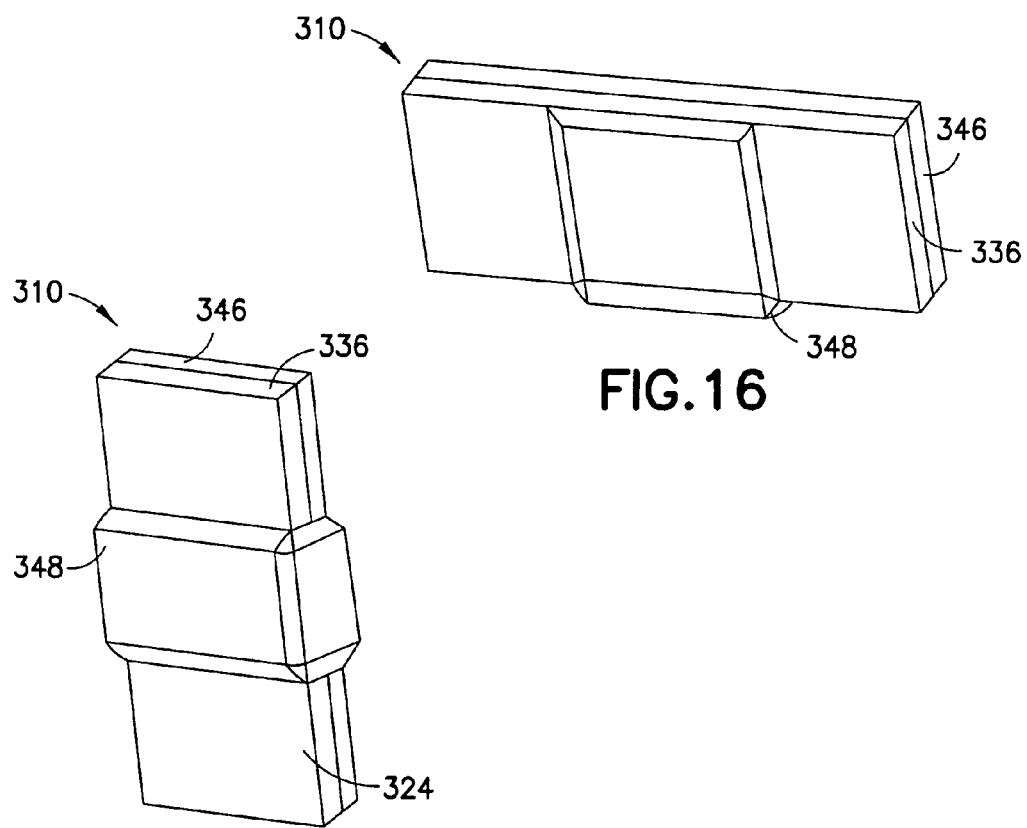
Figure 17:
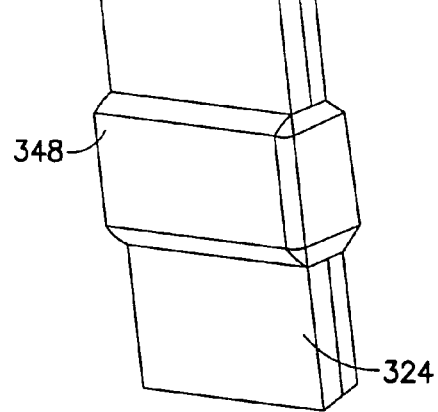
Figure 18:
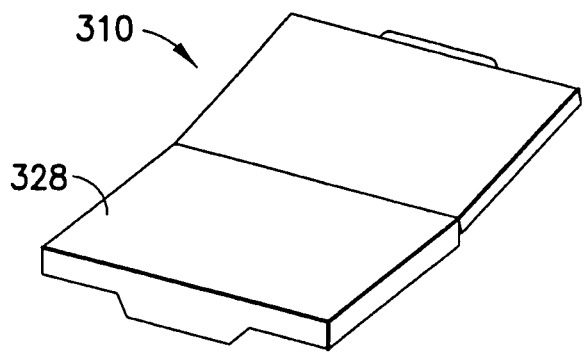
FIGS. 18-20 are perspective views of the electronic device shown in FIGS. 15-17 in a tilted position.
Figure 19:
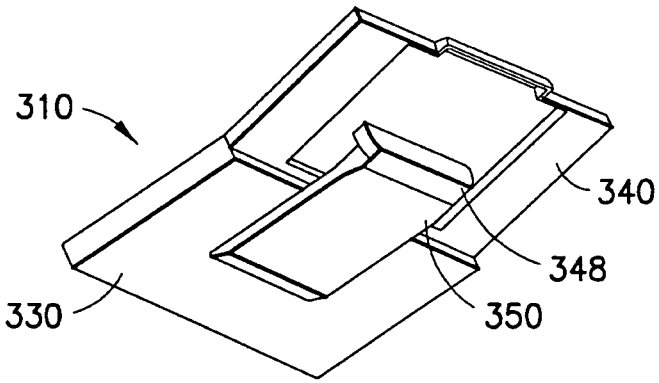
Figure 20:
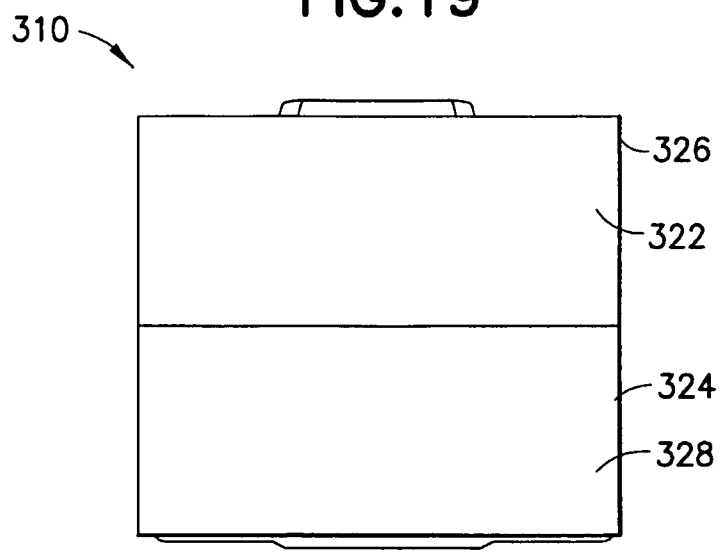
Figure 21:
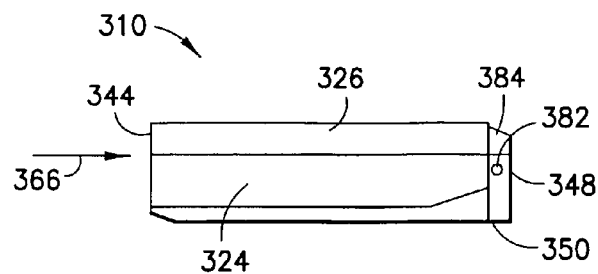
FIG. 21 is a side view of the electronic device shown in FIGS. 15-17.

The dual slide tilt assembly 148 is configured to allow the top end 132 of the lower housing section 124 to be in contact with the bottom end 144 of the upper housing section 126 when the device 110 is in the tilted configuration (see FIG. 8). Additionally, in this tilted position/configuration an edge of the upper surface 138 of the upper housing section 126 is adjacent an edge of the upper surface 128 of the lower housing section 124. The dual slider tilt assembly 148 is configured to provide substantially rotational (or pivoting) motion between the upper hinge member and the lower hinge member when the upper housing section is moved from the fully extended position to the tilted position.

While various embodiments of the invention have been described above in connection with a dual slide tilt assembly wherein the bottom end of the upper housing section moves beyond the top end of the lower housing section when the configuration of the device is changed from the first open position to the fully extended position, one skilled in the art will appreciate that the invention is not necessarily so limited and that other suitable configurations may be provided.

For example, and referring now also to FIGS. 9-14, there are shown views of a device 210 in accordance with another embodiment of the invention. The device 210 is similar to the device 110 and similar features are similarly numbered. Additionally, references made to a similarly numbered feature, such as the lower housing section 224 for example, include any previous descriptions provided for the other similarly numbered feature, such as the lower housing section 124 for example.

The device 210 comprises a housing 212 having the lower housing section 224, an upper housing section 226, and a dual slider tilt assembly 248 connected between the lower housing section 224 and the upper housing section 226. However, in this embodiment the dual slide tilt assembly 248 is configured such that the bottom end 244 of the upper housing section 226 moves along the upper face 228 of the lower housing section 224 without going beyond the top end 232 of the lower housing section 224 when the configuration of the device 210 is changed from the first open position (see FIG. 10) to the fully extended position (see FIGS. 11, 13, 14).

To change the configuration of the device 210 from the closed position (see FIGS. 9, 12) to the first open position (see FIG. 10), the user may manipulate the device 210 by sliding the upper housing section 226 relative to the upper hinge member 254 (in a similar fashion as described above for the device 10, 110) wherein, for example, the movement of the upper housing section 226 from the closed position to the first open position may be provided solely by the upper slide mechanism 256, however, in alternate embodiments any suitable configuration may be provided.

To change the configuration of the device 210 from the first open position (see FIG. 10) to the fully extended position (see FIGS. 11, 13, 14), the user may manipulate the device 210 by sliding the upper housing section 226 relative to the upper hinge member 254, which may be accomplished by further pushing of the bottom end 244 of the upper housing section 226 in a direction towards the top end 232 of the lower housing section 224, such that the bottom end 244 of the upper housing section 226 moves proximate to the top end 232 of the lower housing section 224 without going beyond the top end 232 of the lower housing section 224. This movement of the upper housing section 226 to the fully extended position provides for a substantial majority of the upper face 228 of the lower housing section 224 to be revealed (and accessible). Similar to the device 110, due to the generally curved configuration of the lower housing section, the slide mechanism 252 is configured to provide substantially curvilinear motion (of the hinge members 250, 254 resulting in a tilting of the upper housing section 226 relative to the lower housing section 224) in the direction 270 when the upper housing section 226 is moved from the first open position to the fully extended position. According to some embodiments of the invention, the movement of the upper housing section 226 from the first open position to the fully extended position may be provided solely by the lower slide mechanism 252. For example, pushing of the upper housing section 226 (from the first open position) causes relative movement between the lower hinge member 250 and the lower housing section 224 at the lower slide mechanism 252, such that the lower hinge member 250 and the upper hinge member 254 slide away (in the direction 270) from the top end 232 of the lower housing section 224. However, in alternate embodiments any suitable configuration may be provided.

Additionally, in this embodiment the tilting of the upper housing section 226 is provided by the sliding of the upper housing section 226 to the fully extended position as the curved configuration of the lower housing section 224, the lower hinge member 250, and the lower slide mechanism 252, provides the tilting angle as the hinge axis point moves upwards (for example see distance 272) in response to the movement from the first open position to the fully extended position.

Referring now also to FIGS. 15-25, there is shown a device 310 in accordance with another embodiment of the invention. The device 310 is similar to the device 10 and similar features are similarly numbered. Additionally, references made to a similarly numbered feature, such as the housing 310 for example, include any previous descriptions provided for the other similarly numbered feature, such as the housing 10 for example.

The device 310 comprises a housing 312 having a lower housing section 324, an upper housing section 326 and a dual slider tilt assembly 348 connected between the lower housing section 324 and the upper housing section 326. However, in this embodiment the lower housing section 324 and the upper housing section 326 each comprise a full size display.

Figure 26:
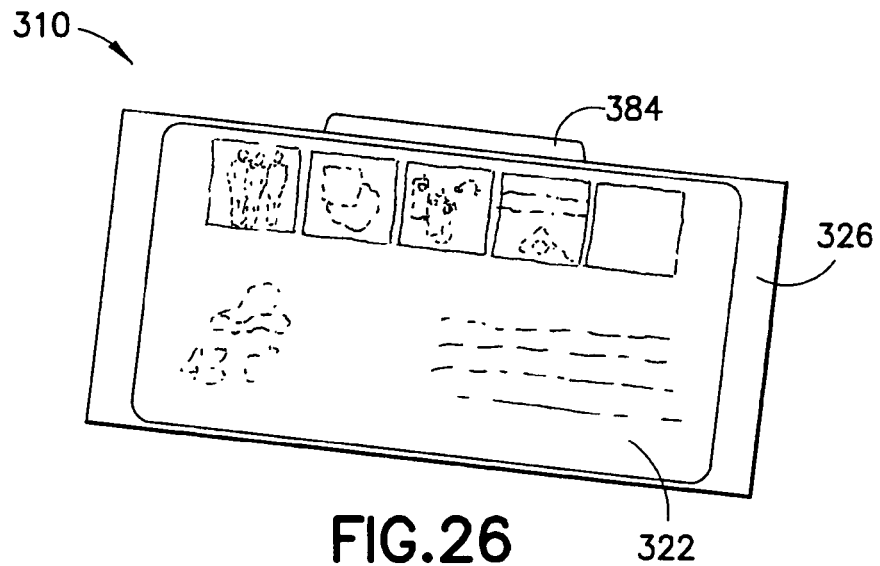
FIG. 26 is a perspective view of the electronic device shown in FIGS. 15-17 in a closed position.
Figure 27:
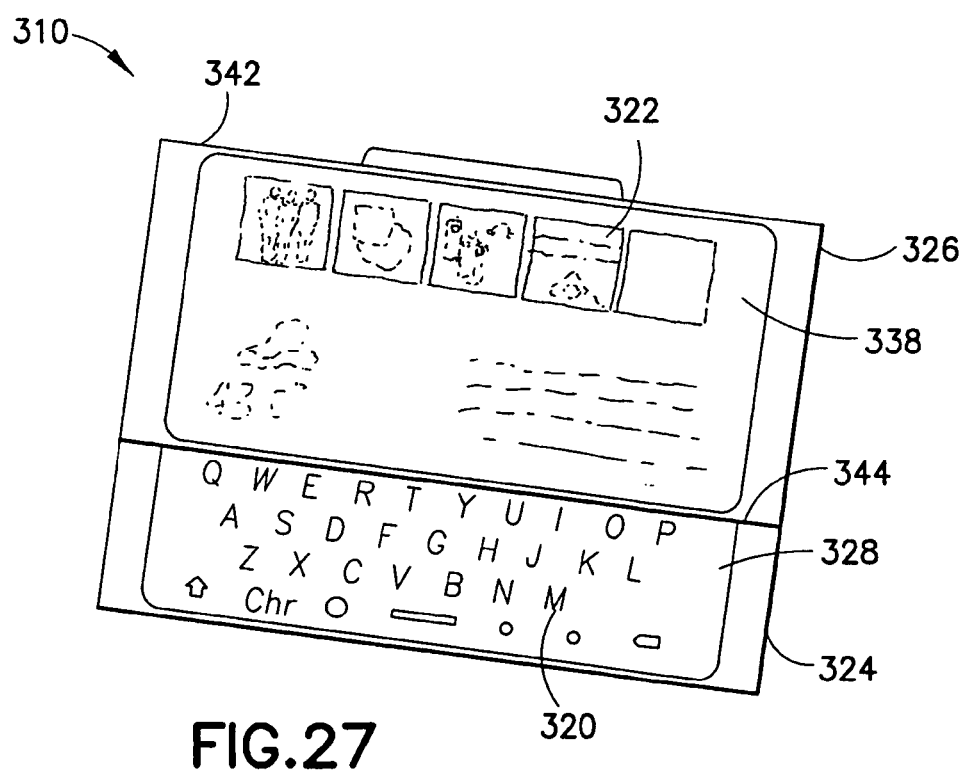
FIG. 27 is a perspective view of the electronic device shown in FIGS. 15-17 in a first open position.
Figure 28:
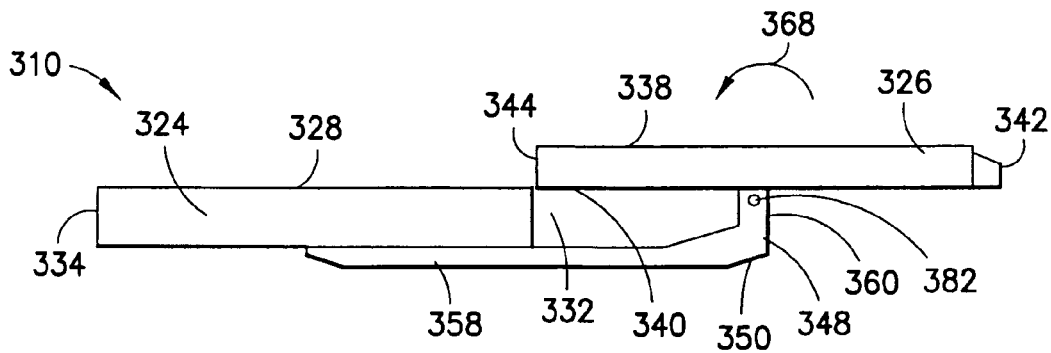
FIG. 28 is a side view of the electronic device shown in FIGS. 15-17 in a fully extended position.
Figure 29:
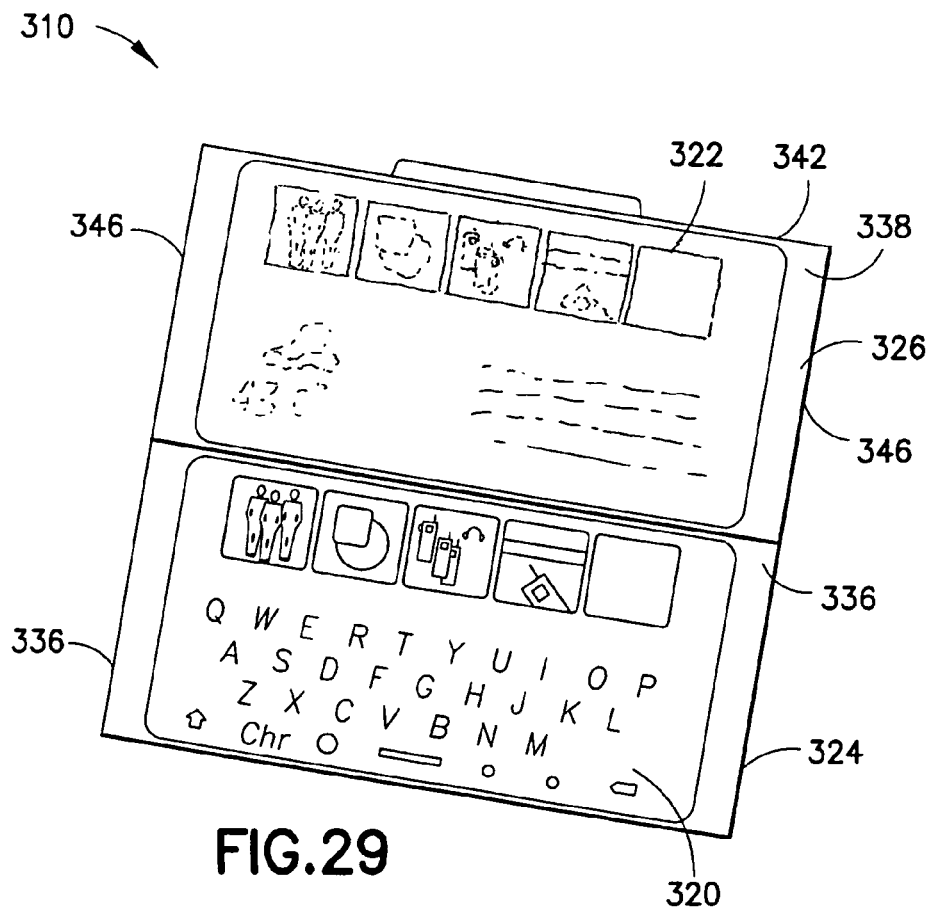
FIG. 29 is a perspective view of the electronic device shown in FIGS. 15-17 in a tilted position.

Referring now also to FIGS. 26-29, the lower housing section 324 and the upper housing section 326 are movably connected to each other. In particular, the upper housing section 326 is movably connected to the lower housing section 324 between a closed position as shown in FIG. 26, a first open position as shown in FIG. 27, a fully extended position as shown in FIG. 28, and a tilted position as shown in FIG. 29.

Figure 22:
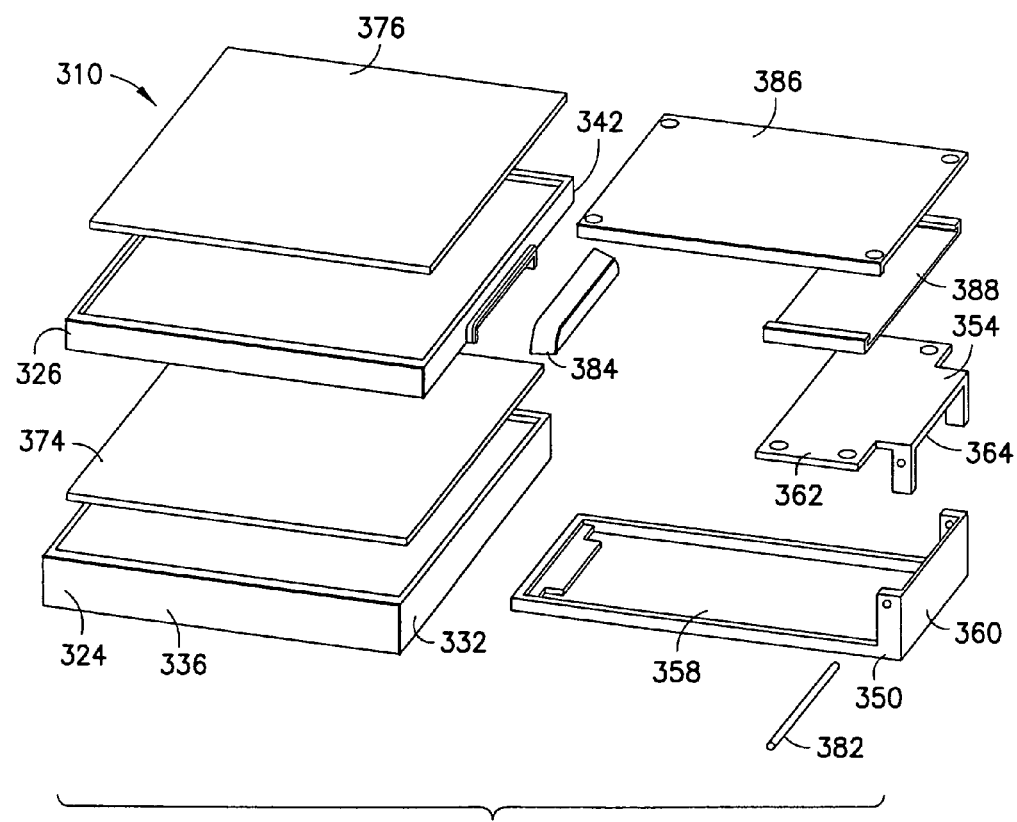
FIG. 22 is an exploded perspective view of a portion of the electronic device (and a portion of a dual slider tilt assembly) shown in FIGS. 15-17.

The lower housing section 324 comprises an upper face 328 and an opposite lower face 330. According to some examples of the invention, the lower housing section 324 comprises a touch screen user input region 320 at the upper face 328. In alternate embodiments, any suitable type of display and/or user input region may be provided at the upper face 328. Additionally, some embodiments of the invention may comprise a window 374 (as shown in FIG. 22), which may be a substantially transparent plastic window for example, covering the touch screen display 320 at the upper face 328. However, any suitable configuration may be provided. Similar to the device 10, the upper face 328 is substantially covered by the upper housing section 326 when the device 310 is in the closed position. When the device 310 is in the first open position, a portion of the upper face 328 forms a portion of a front face of the device 310. When the device 310 is in the fully extended position and the tilted position, the entire upper face 328 forms a portion (such as about half, or about fifty percent, for example) of the front face of the device 310. The lower face 330 forms the back face of the device 310 when the device 310 is in the closed position. The lower face 330 forms a portion of the back face of the device 310 when the device 310 is in the first open, fully extended, and tilted positions (such as about half, or about fifty percent, of the back face, for example, when the device 310 is in the fully extended or tilted position). Additionally, the lower housing section comprises a top end 332, a bottom end 334, and lateral sides 336 between the upper face 328 and the lower face 330. According to various exemplary embodiments of the invention, the upper and lower faces 328, 330 each comprise a substantially flat (or planar) configuration. However, in alternate example embodiments, any suitable surface shape/configuration may be provided. Further, the lower housing section 324 may comprise a one-piece member formed from plastic, for example. However, any suitable configuration and/or material may be provided.

The upper housing section 326 comprises an upper face 338 and an opposite lower face 340. According to some examples of the invention, the upper housing section 326 comprises a display 322 (such as a touch screen display, for example) at the upper face 338. Additionally, some embodiments of the invention may comprise a window 376 (as shown in FIG. 22), which may be a substantially transparent plastic window for example, covering the display 322 at the upper face 338. However, it should be noted that any suitable configuration having a user input region and/or a display at the upper face may be provided.

The upper face 338 forms the front face of the device 310 when the device 310 is in the closed position (or closed configuration). The upper face 338 forms a portion of the front face of the device 310 when the device 310 is in the first open position (or first open configuration). The entire upper face 338 forms a portion (such as about half, or about fifty percent, for example) of the front face of the device 310 when the device 310 is in the fully extended position (or fully extended configuration) and the tilted position (or tilted configuration). The lower face 340 is substantially covered by the lower housing section 324 when the device 310 is in the closed position. When the device 310 is in the first open position, a portion of the lower face 340 forms a portion of a back face of the device 310. When the device 310 is in the fully extended position and the tilted position, the entire lower face 340 forms a portion (such as about half, or about fifty percent, for example) of the back face of the device 310. Additionally, the upper housing section 326 comprises a top end 342, a bottom end 344, and lateral sides 346 between the upper face 338 and the lower face 340. According to various exemplary embodiments of the invention, the upper and lower faces 338, 340 each comprise a substantially flat (or planar) configuration. However, in alternate example embodiments, any suitable surface shape/configuration may be provided. Further, the upper housing section 326 may comprise a one-piece member formed from plastic, for example. However, any suitable configuration and/or material may be provided.

Figure 23:
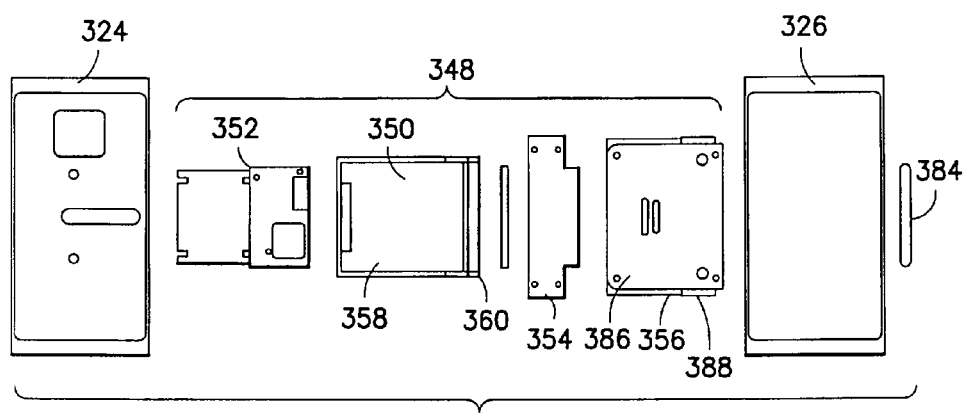
FIG. 23 is an exploded view of the dual slider tilt assembly and housing sections.
Figure 24:
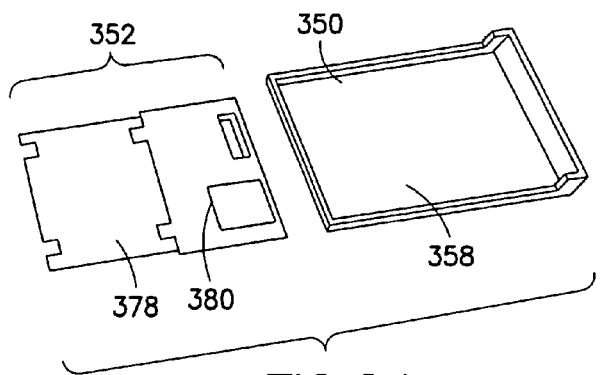
FIG. 24 is an exploded perspective view of a portion of the dual slider tilt assembly.
Figure 25:
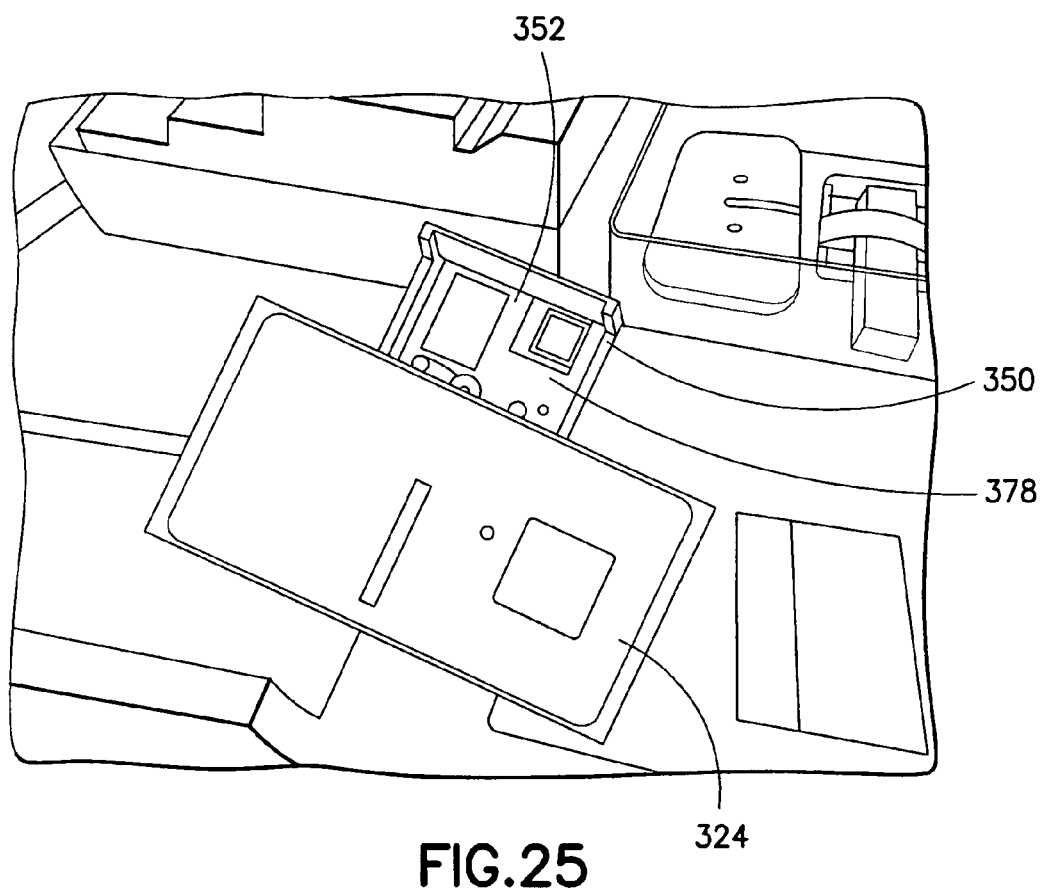
FIG. 25 is a perspective view of a portion of the electronic device (and a portion of the dual slider tilt assembly) shown in FIGS. 15-17.

The lower housing section 324 and the upper housing section 326 are connected to each other by a dual slider tilt assembly 348. As shown in FIG. 23, the dual slider tilt assembly 348 comprises a lower hinge member 350, a lower slide mechanism 352, an upper hinge member 354, and an upper slide mechanism 356.

The lower hinge member 350 comprises a first end 358 and a second end 360. The first end 358 is suitably sized and shaped to extend over at least a portion of the lower face 330 of the lower housing section 324. The second end 360 is suitably sized and shaped to extend over the top end 332 of the lower housing section 324. The lower hinge member 350 may further comprise a one-piece member fabricated from any suitable material, such as aluminum, for example. According to various exemplary embodiments of the invention, a substantial majority of the first end 358 comprises a substantially flat (or planar) configuration. However, in alternate example embodiments, any suitable shape/configuration may be provided.

The lower slide mechanism 352 is connected between the lower hinge member 350 and the lower housing section 324. The lower slide mechanism 352 provides a slidable connection between the lower hinge member 350 and the lower housing section 324. The lower slide mechanism 352 (which may be a semi-automatic slide mechanism, for example) comprises a slide plate 378 and a slide element 380 movably (or slidably) mounted to the slide plate 378. According to various exemplary embodiments of the invention, the slide plate 378 is attached to the lower hinge member 350 and the slide element 380 is attached to the lower housing section 324. Additionally, a spring member may be provided between the slide plate 378 and the slide element 380. However, any suitable configuration or type of slide mechanism may be provided between the lower hinge member 350 and the lower housing section 324. Additionally, according to some embodiments of the invention, a portion of the slide mechanism may be integrally formed with the lower hinge member and/or the lower housing section.

The upper hinge member 354 comprises a first end 362 and a second end 364. The first end 362 is suitably sized and shaped to extend over at least a portion of the lower face 340 of the upper housing section 326. The second end 364 is pivotably connected to the second end 360 of the lower hinge member 350 by a hinge pin 382. The hinge pin 382 may be fabricated from any suitable material, such as steel, for example. The hinge pin 382 may be suitably sized and shaped to extend through corresponding openings in the lower hinge member 350 and the upper hinge member 354, such that the upper hinge member 354, the lower hinge member 350, and the hinge pin 382 form a hinge assembly. However, in alternate embodiments any suitable type of pivotable connection may be provided. The upper hinge member 354 may further comprise a one-piece member fabricated from any suitable material, such as aluminum, for example.

According to some exemplary embodiments of the invention, a hinge cover 384 may be provided at the upper housing section 326. The hinge cover 384 may comprise a one-piece member formed from any suitable material, such as aluminum, for example. The hinge cover 384 is suitably sized and shaped to cover a portion of the upper hinge member 354 extending beyond the top end 342 of the upper housing section 326.

The upper slide mechanism 356 is connected between the upper hinge member 354 and the upper housing section 326. The upper slide mechanism 356 provides a slidable connection between the upper hinge member 354 and the upper housing section 326. The upper slide mechanism 356 (which may be a semi-automatic slide mechanism, for example) comprises a slide plate 386 and a slide element 388 movably (or slidably) mounted to the slide plate 386. According to various exemplary embodiments of the invention, the slide plate 386 is attached to the upper housing section 326 and the slide element 388 is attached to the upper hinge member 354. Additionally, a spring member may be provided between the slide plate 386 and the slide element 388. However, any suitable configuration or type of slide mechanism may be provided between the upper hinge member 354 and the upper housing section 326. Additionally, according to some embodiments of the invention, a portion of the slide mechanism may be integrally formed with the lower hinge member and/or the lower housing section.

Similar to the device 10, to change the configuration of the device 310 from the closed position (see FIG. 26, for example) to the first open position (see FIG. 27, for example), a user may manipulate the device 310 by sliding the upper housing section 326 relative to the upper hinge member 354, which may be accomplished by pushing the bottom end 344 of the upper housing section 326 in a direction 366 towards the top end 332 of the lower housing section 324. The pushing of the upper housing section 326 may include, for example, pushing against a spring force of the upper slide mechanism 356. The slide mechanism 356 is configured to provide substantially translational (or linear) motion in the direction 366 (along a plane parallel to the upper face 328 of the lower housing section 324). According to some embodiments of the invention, the movement of the upper housing section 326 from the closed position to the first open position may be provided solely by the upper slide mechanism 356, however in alternate embodiments any suitable configuration may be provided. In this first open position, a majority of the upper surface 328 of the lower housing section 324 may be revealed such that a touch screen QWERTY keyboard may be provided. However, it should be noted that any suitable configuration may be provided.

To change the configuration of the device 310 from the first open position (see FIG. 27, for example) to the fully extended position (see FIG. 28, for example), the user may manipulate the device 310 by sliding the upper housing section 326 relative to the upper hinge member 354, which may be accomplished by further pushing of the bottom end 344 of the upper housing section 326 in the direction 366 towards the top end 332 of the lower housing section 324, such that the bottom end 344 of the upper housing section 326 moves beyond the top end 332 of the lower housing section 324 (in the direction 366). The pushing of the upper housing section 326 may include, for example, pushing against a spring force of the lower slide mechanism 352. This movement of the upper housing section 326 to the fully extended position provides for the entire upper face 328 of the lower housing section 324 to be revealed (and accessible). The slide mechanism 352 is configured to provide substantially translational (or linear) motion in the direction 366 (along the plane parallel to the upper face 328 of the lower housing section 324) when the upper housing section 326 is moved from the first open position to the fully extended position. According to some embodiments of the invention, the movement of the upper housing section 326 from the first open position to the fully extended position may be provided solely by the lower slide mechanism 352. For example, pushing of the upper housing section 326 (from the first open position) causes relative movement between the lower hinge member 350 and the lower housing section 324 at the lower slide mechanism 352, such that the lower hinge member 350 and the upper hinge member 354 slide away from the top end 332 of the lower housing section 324 (see FIG. 28). However, in alternate embodiments any suitable configuration may be provided.

To change the configuration of the device 310 from the fully extended position (see FIG. 28, for example) to the tilted position (see FIG. 29, for example), the user may manipulate the device 310 by tilting (in a direction 368) the upper housing section 326 towards the lower housing section 324. This may be accomplished by pivoting of the upper hinge member 354 relative to the lower hinge member 350 (in response to the tilting of the upper housing section 326). The dual slide tilt assembly 348 is configured to allow the top end 332 of the lower housing section 324 to be in contact with the bottom end 344 of the upper housing section 326 when the device 310 is in the tilted configuration (see FIG. 29). Additionally, in this tilted position/configuration an edge of the upper surface 338 of the upper housing section 326 is adjacent an edge of the upper surface 328 of the lower housing section 324. According to some embodiments of the invention, a spring member 390 (see FIG. 32) may be provided between the upper hinge member 354 and the lower hinge member 350 such that the upper housing section 326 automatically tilts when the upper housing section 326 is in the fully extended position (such that the upper housing section 326 is pushed beyond, and no longer over, the lower housing section 324). However, any suitable configuration may be provided. The dual slider tilt assembly 348 is configured to provide substantially rotational (or pivoting) motion in the direction 368 between the upper hinge member 354 and the lower hinge member 350 when the upper housing section 326 is moved from the fully extended position to the tilted position.

Figure 30:
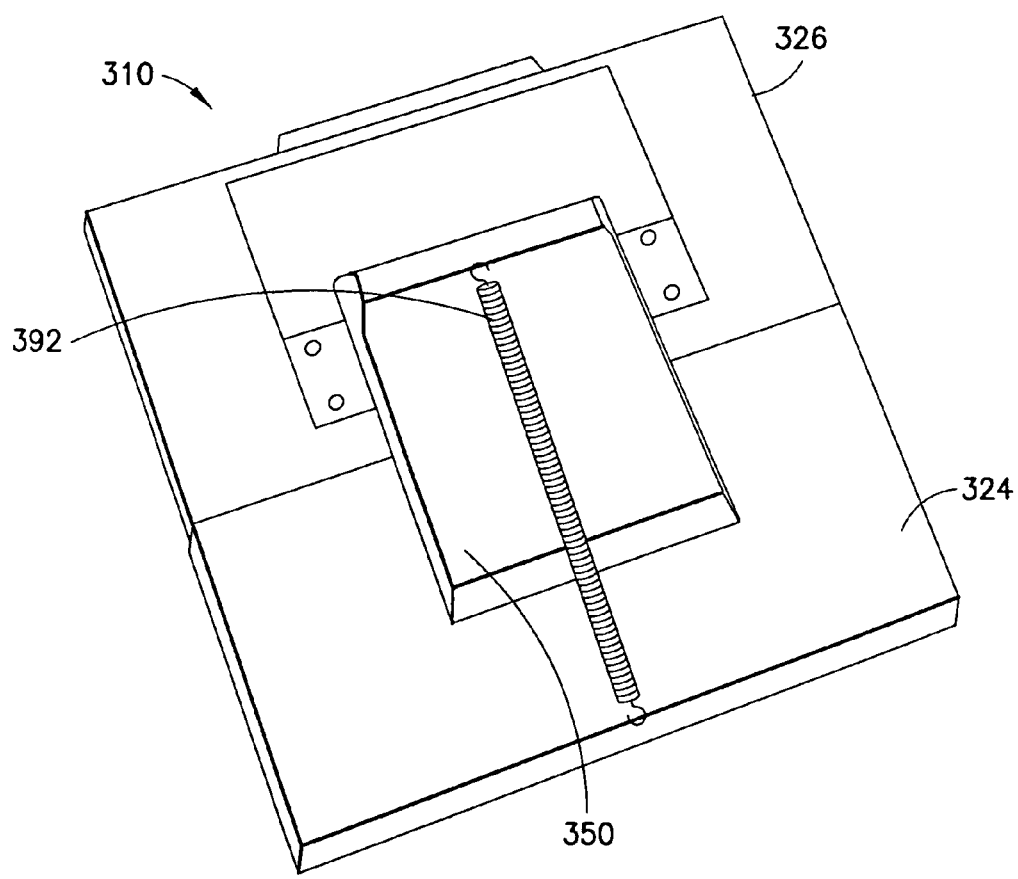
FIG. 30 is a perspective view of the electronic device (with portions illustrated as transparent) shown in FIGS. 15-17 in a tilted position.
Figure 31:
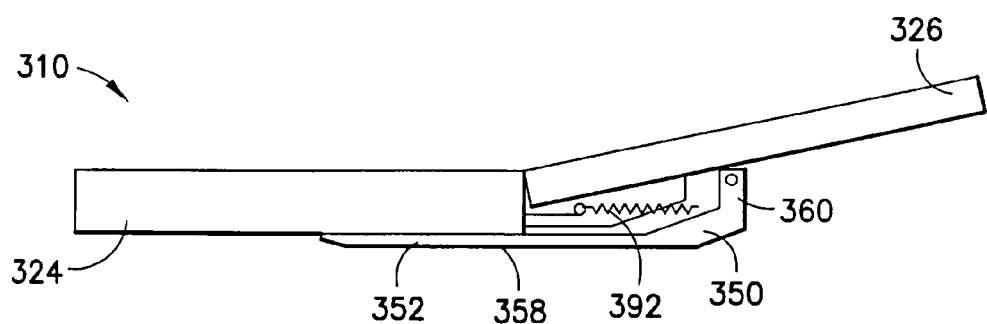
FIGS. 31-32 are partial section views of the electronic device shown in FIGS. 15-17 in a tilted position.

Referring now also to FIGS. 30 and 31, the dual slide tilt assembly 348 may form a semi automatic slider assembly having various additional springs. For example, a long coil spring 392 may be provided between the lower housing section 324 and the lower hinge member 350 wherein the coil spring 392 is configured to pull the lower hinge member 350 such that the lower slide mechanism 352 is biased towards the closed position. It should be noted however, that a long coil spring is not required, and any suitable configuration (or any other suitable type of spring member) may be provided. Additionally, it should be noted that the above mentioned spring may be suitably disposed within the housing such that it are not visible to a user of the device.

Figure 32:
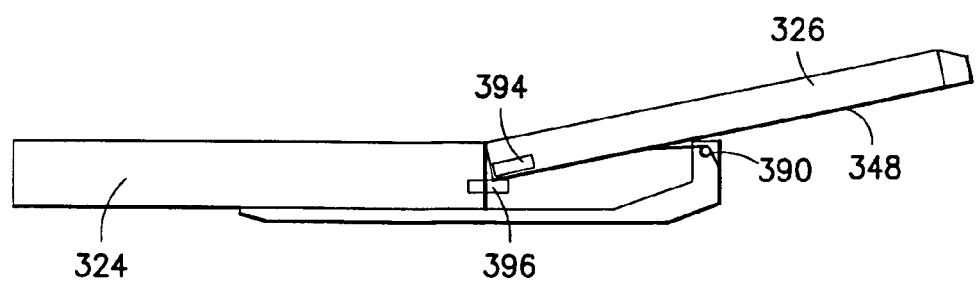
Figure 33:
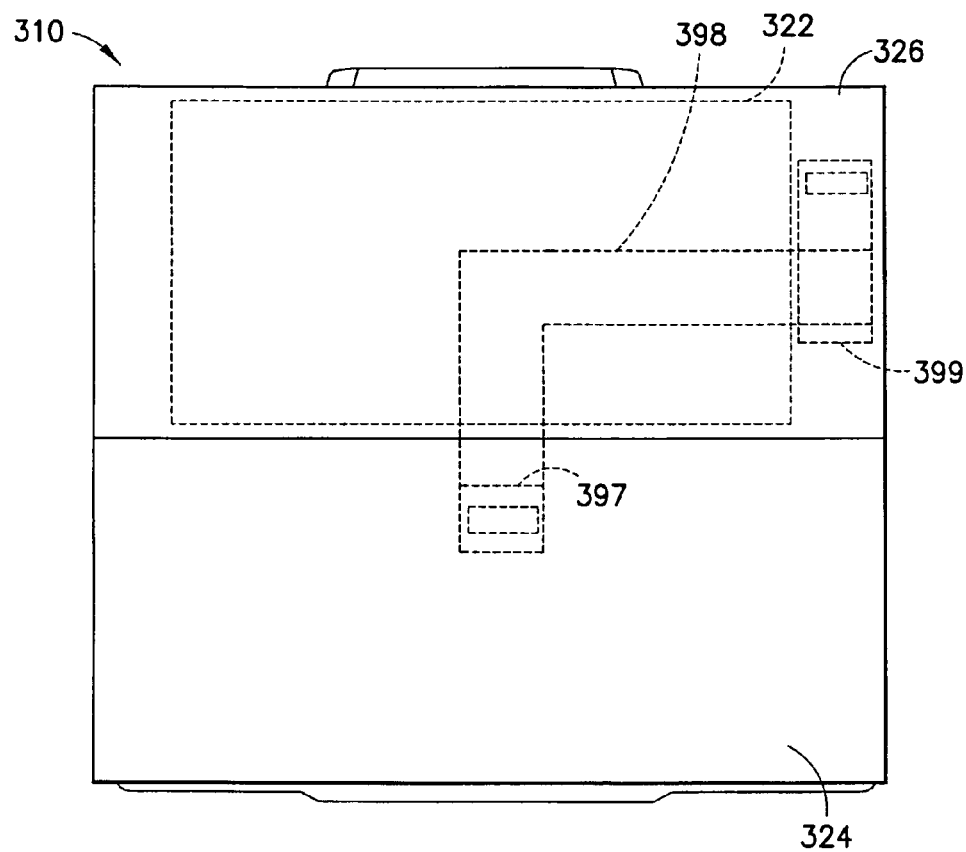
FIGS. 33-35 are perspective views of the electronic device shown in FIGS. 15-17 illustrating hidden line features.
Figure 34:
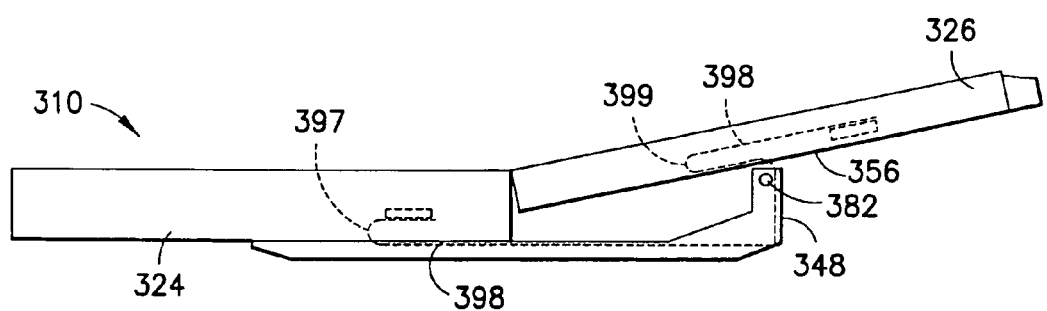

Referring now also to FIG. 32, the device 310 may further comprise various magnets 394, 396. For example, according to one embodiment of the invention, one magnet 394 may be provided at the upper housing section (or lid) 324 and another magnet 396 may be provided at the lower housing section (or lower block) 324. The magnets 394, 396 may be configured for keeping the upper housing section 326 and the lower housing section 324 firmly in place when they are in the tilted position, for example. However, any suitable magnet configuration may be provided. Additionally, it should be noted that the above mentioned magnets 394, 396 may be suitably disposed within the housing such that they are not visible to a user of the device 310.

Any suitable type of electrical connection between the lower housing section 324 and the upper housing section 326 may be provided. Due to the limited space provided by the dual slide configuration some connection types may be challenging. However, various configurations comprising a flex cable, or flexible cable, (among other possible configuration types) may be utilized. For example, according to some embodiments of the invention, and referring now also to FIGS. 33 and 34, an electrical connection may be provided in the form of a flex (or flex cable) 398 extending from the lower housing section 324 to the upper housing section 326. The flex 398 configuration may comprise two separate flex rollers; one into the lower housing section 324 and another into the upper housing section 326. The lower housing section roller 397 may be any suitable type of roller as is known in the art (in particular the roller may be any type of roller used in conventional slide phone configurations). The upper housing section roller 399 may be provided such that the flex 398 is glued to a portion of the upper slide mechanism 356 and goes around the hinge pin 382. According to some embodiments of the invention, the upper housing section flex roller 399 is preferably disposed beside (or adjacent) the display module 322, and thus should be as narrow as possible, wherein for example there is provided an air gap flex, about 2 or 3 layers, and/or about 8-9 mm wide.

Figure 35:
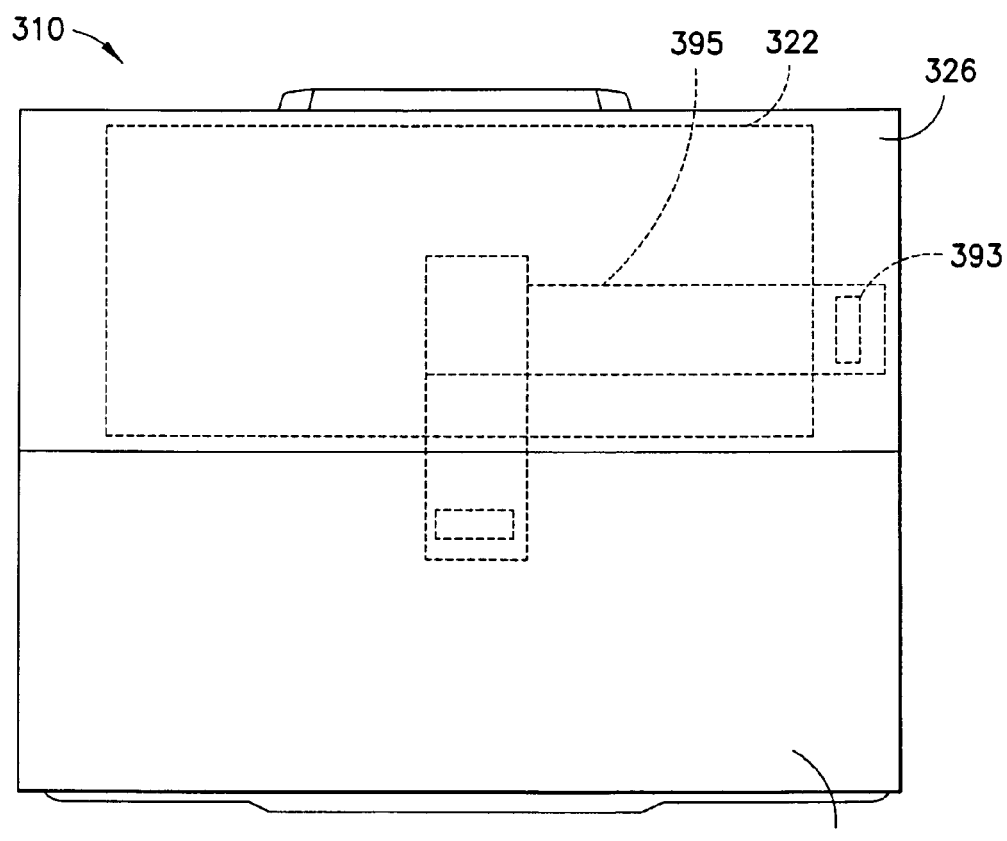
Figure 36:
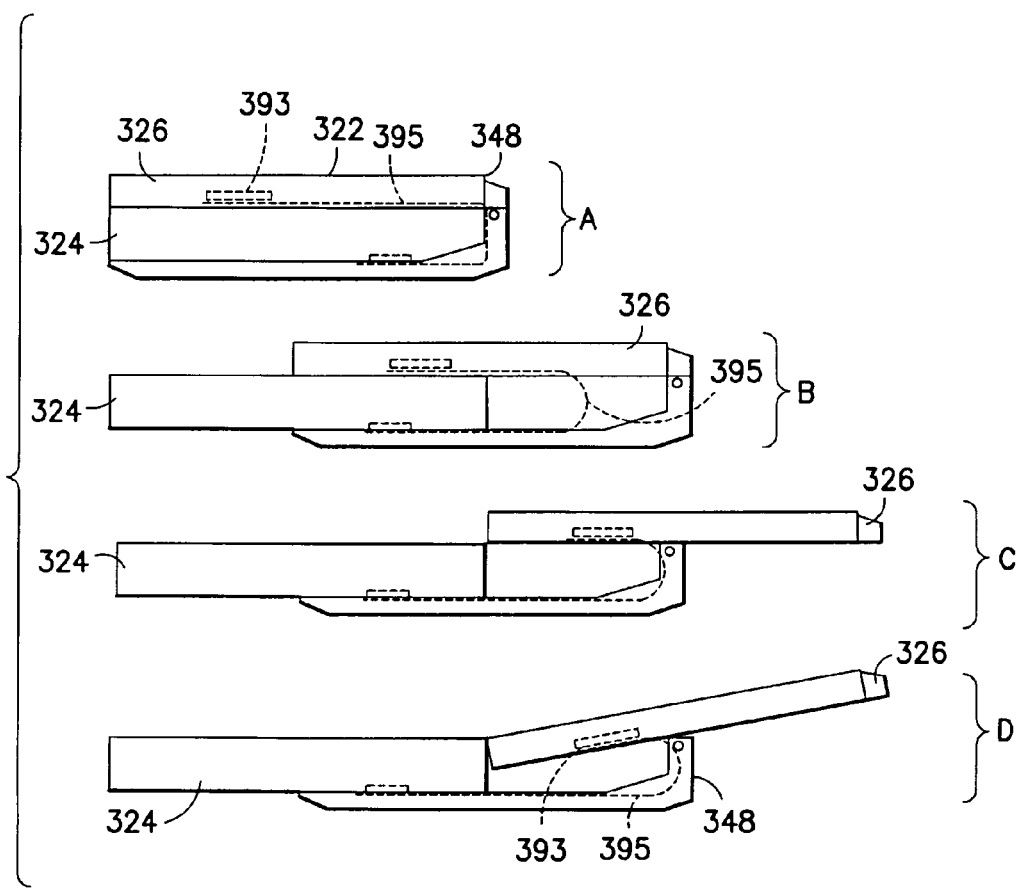
FIG. 36 is a composite side view of the electronic device shown in FIGS. 15-17 in closed, first open, fully extended, and tilted positions (illustrating hidden line features)

For example, according to some other embodiments of the invention, and referring now also to FIGS. 35 and 36, the electrical connection may be provided in the form of a flex (or flex cable) 395 between the housing sections 324, 326 and synchronizing the movements of the dual slider tilt assembly such that the lower housing section 324 moves first when moving from the closed configuration (see "A" in FIG. 36) to the first open position (see "B" in FIG. 36). For example, according to one embodiment of the invention, the synchronization may be provided such that the lower slide mechanism 352 and the upper slide mechanism 356 move at the same time. This allows for the upper housing section 326, the upper hinge member 354, and the lower hinge member 350 to move away from the lower housing section 324 simultaneously (as shown in "A", "B" of FIG. 36). Some embodiments of the invention may include one or more connecting lever(s) to facilitate the synchronized movements, however, any suitable synchronizing configuration may be provided. Additionally, other exemplary changes in configuration with the flex 395 are shown, such as the fully extended position (see "C" in FIG. 36), and the tilted position (see "D" in FIG. 36). In this example embodiment, the flex 395 could be a simple loop under the slide mechanism 356. For example, in the upper housing section 326, a connector 393 may be disposed beside (or adjacent) the display 322 in order to keep the upper housing section 326 as thin as possible.

Figure 37:
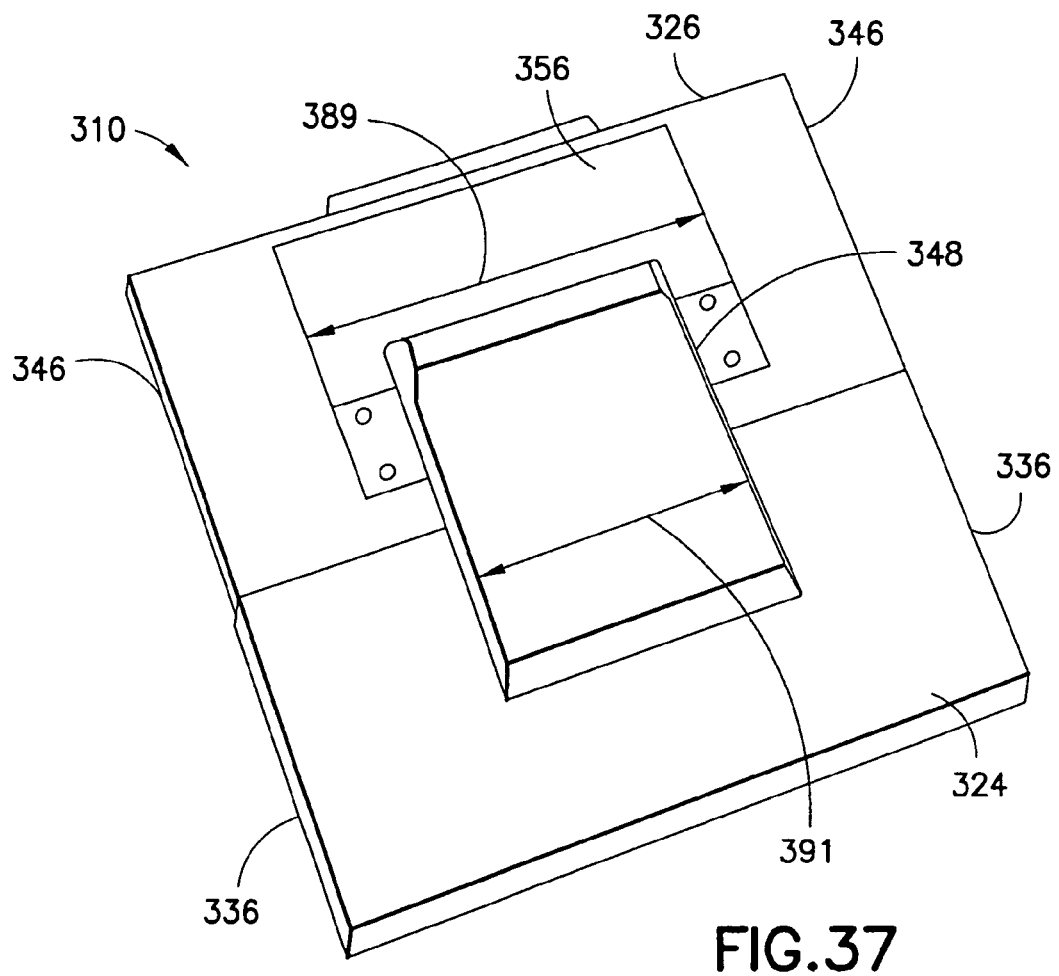
FIG. 37 is a perspective view of a rear face the electronic device shown in FIGS. 15-17 in a tilted position.

It should be noted that the dual slider tilt assembly 348 may comprise any suitable width (such as a width dimension 391 in a direction extending between the lateral sides 336, 346 of the device as shown in FIG. 37). According to one example embodiment, the assembly 348 may comprise a substantially narrow width (relative to the width of the device 310), which may provide for ease of use, as this provides increased surface area at the lower housing section 324 for manipulation by a user's finger (such as an index finger, for example). However, it should be noted that narrower configurations may impact robustness of the assembly 348. According to another example embodiment, the assembly 348 may comprise a substantially wider dimension 391. However, it should be noted that wider configurations may impact usablity of the dual slider tilt assembly 348 as this provides decreased surface area at the lower housing section 324 for manipulation by a user's finger. Additionally, it should be noted that a width 389 of the slide mechanism 356 may also be varied in some embodiments of the invention. For example, some embodiments of the invention may provide the width 389 of the upper slide mechanism 356 to be suitably sized such that the display 322 fits between the sliding surfaces of the upper slide mechanism 356. It should be noted that a width of the lower slide mechanism 352 may instead, or additionally, be varied. However, any suitable configuration may be provided.

Figure 38:
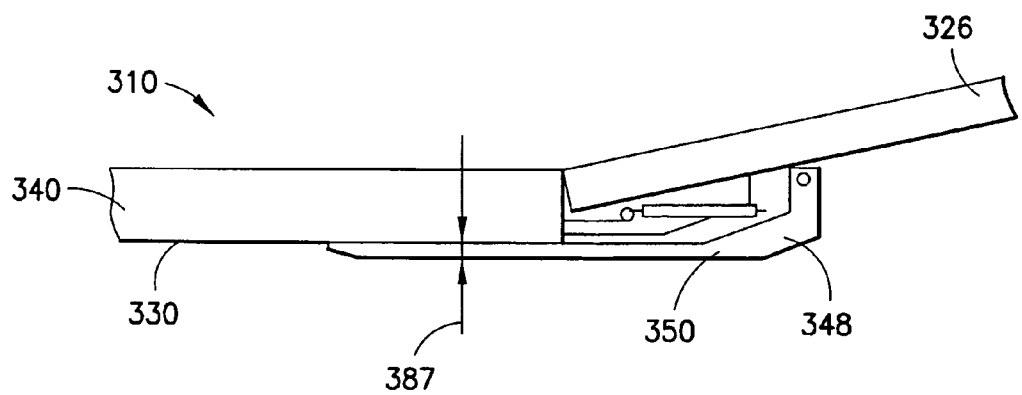
FIG. 38 is a side view of the electronic device shown in FIGS. 15-17 in a tilted position.
Figure 39:
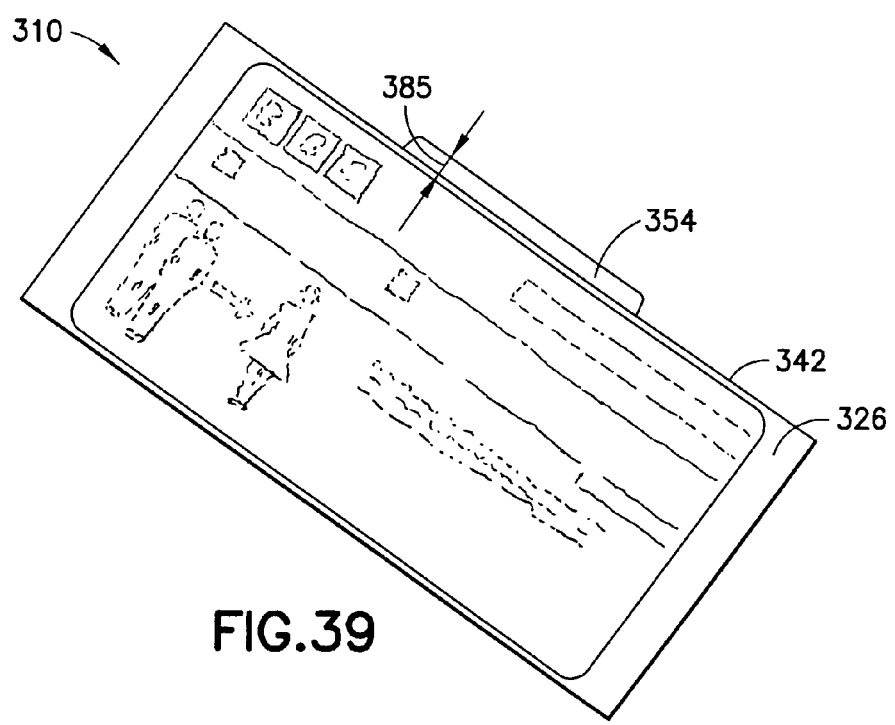
FIG. 39 is a top view of the electronic device shown in FIGS. 15-17 in a closed position.

Referring now also to FIG. 38, the dual slider tilt assembly 348 may comprise any suitable thickness. According to one example embodiment, the assembly 348 may comprise a configuration wherein the lower hinge member 350 is lifted from the lower surface 330 of the lower housing 324 section about 2.5 mm (see dimension 387, for example). According to other example embodiments, the lower hinge member 350 (as well as other portions of the assembly) can also be pushed into lower housing section, 324 and can be even behind a wall from back side. However, any suitable configuration may be provided.

According to various exemplary embodiments of the invention, a portion of the upper hinge member 354 extends beyond the top end 342 of the upper housing section 326 by a dimension 385 to facilitate alignment and placement of the housing sections 324, 326 beside each other. In one embodiment of the invention, the dimension 385 is about 3.0 mm. In other example embodiments, the dimension 385 could be minimized to about 1.5-2.0 mm. However, any suitable configuration may be provided.

Figure 40:
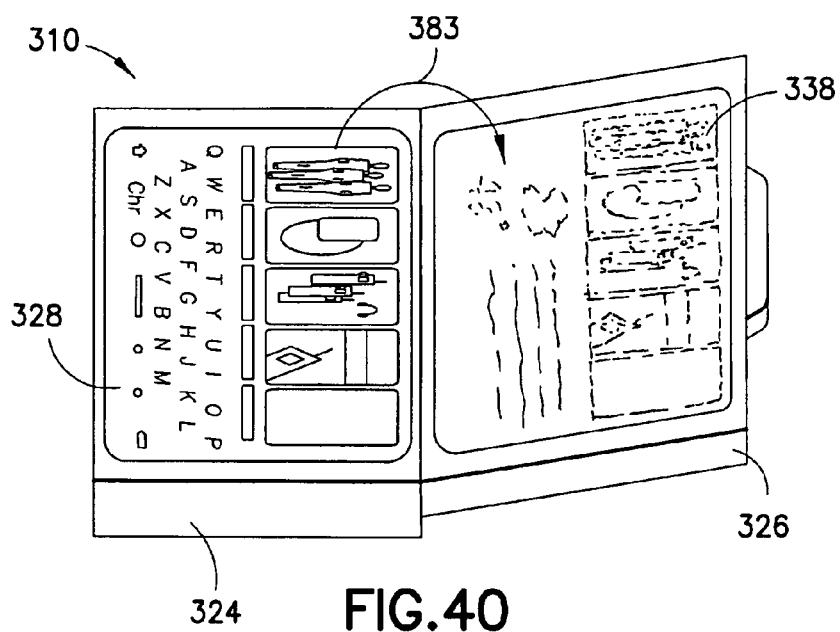
FIG. 40 is a perspective view of the electronic device shown in FIGS. 15-17 in a tilted position.
Figure 41:
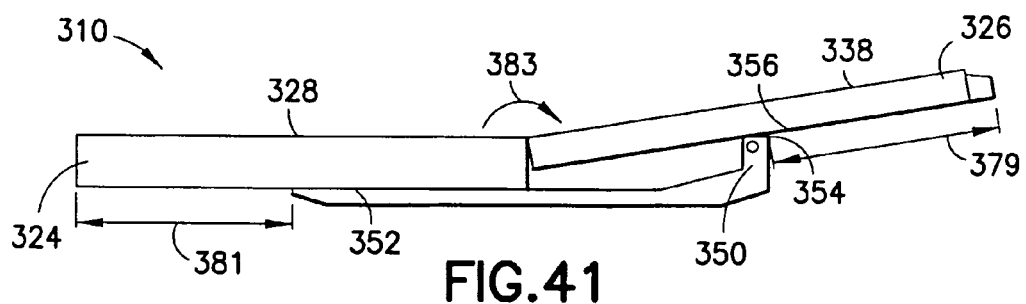
FIG. 41 is a side view of the electronic device shown in FIGS. 15-17 in a tilted position.

Referring now also to FIGS. 40 and 41, an angle 383 between the upper face 328 of the lower housing section 324 and the upper face 338 of the upper housing section 326 (when the device 310 is in the tilted position) generally depends on the thicknesses of the housing sections 324, 326 and where the pivot point of the hinge members 350, 354 is located. According to various exemplary embodiments, the angle 383 is about 169.2 degrees. However, in alternate embodiments, any suitable angle may be provided. Additionally, any suitable ratio of sliding distances 381, 379 may be provided. According to some embodiments of the invention, as shown in FIG. 41, for example, the upper slide mechanism 356 is configured to move a distance 379 of about 30.2 mm and the lower slide mechanism 352 is configured to move a distance 381 of about 27.5 mm. However, any suitable ratio of the distances 379, 381 may be provided such as a ratio of about 50/50, for example.

The device 310 may further comprise any suitable type of interface connections. For example, various exemplary embodiments of the invention comprise a suitable location 377 at the bottom end 334 of the lower housing section 324 for interface connector (see FIG. 42). However, in alternate embodiments, any suitable location for connectors may be provided.

Figure 42:
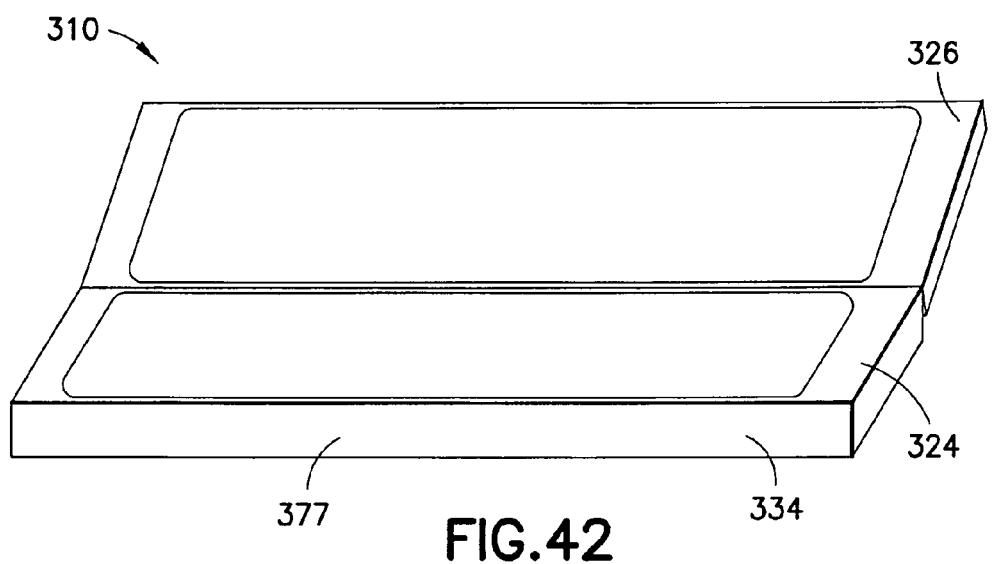
FIG. 42 is a perspective view of the electronic device shown in FIGS. 15-17 in a tilted position.
Figure 43:
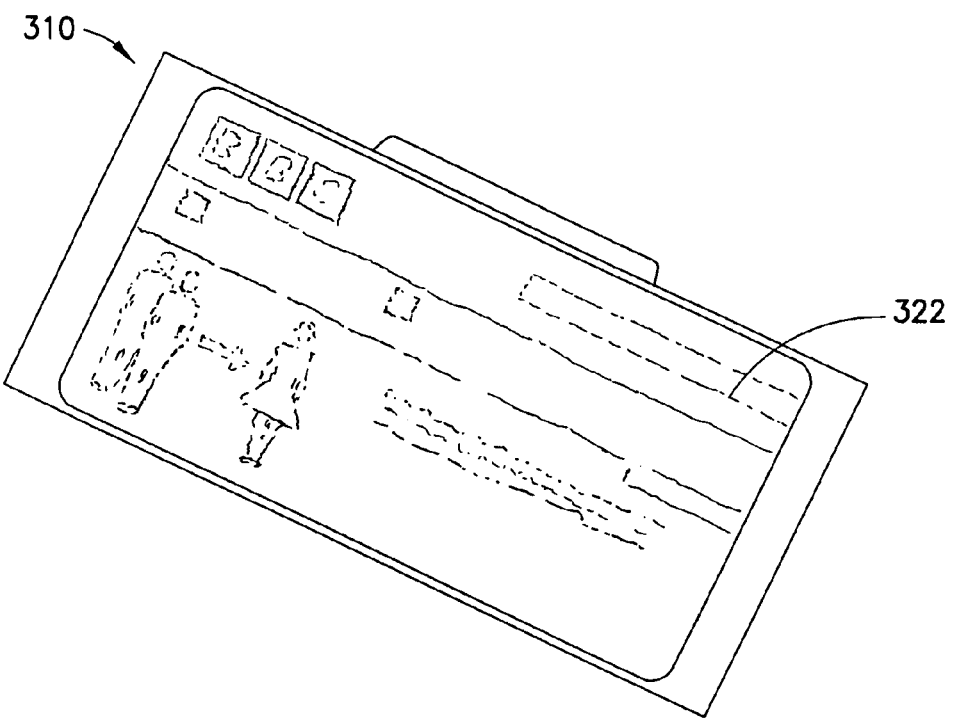
FIGS. 43 and 45 are top views of the electronic device shown in FIGS. 15-17 in a closed position.
Figure 44:
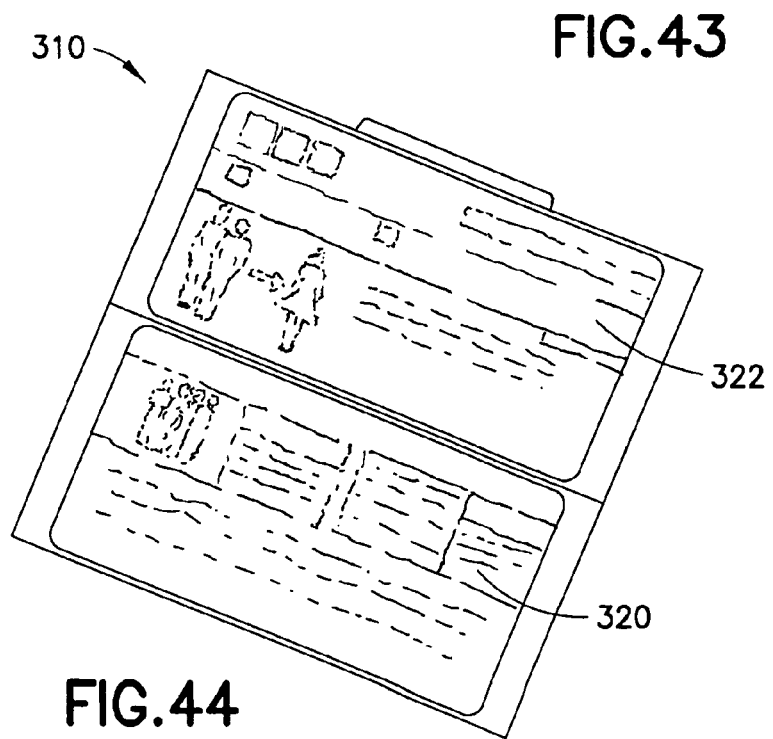
FIGS. 44 and 46 are top views of the electronic device shown in FIGS. 15-17 in a titled position.
Figure 45:
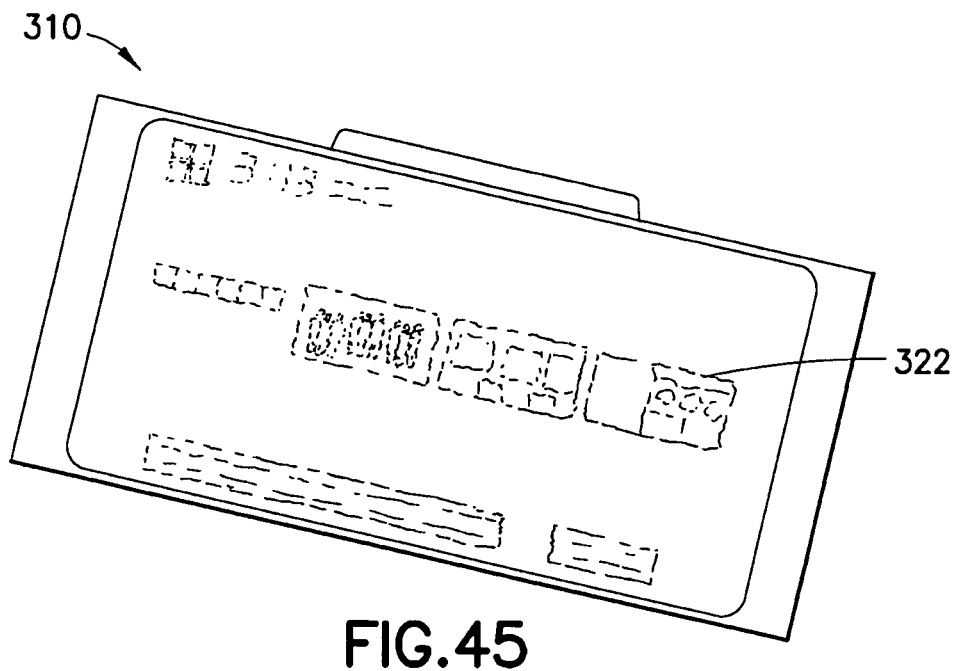
Figure 46:
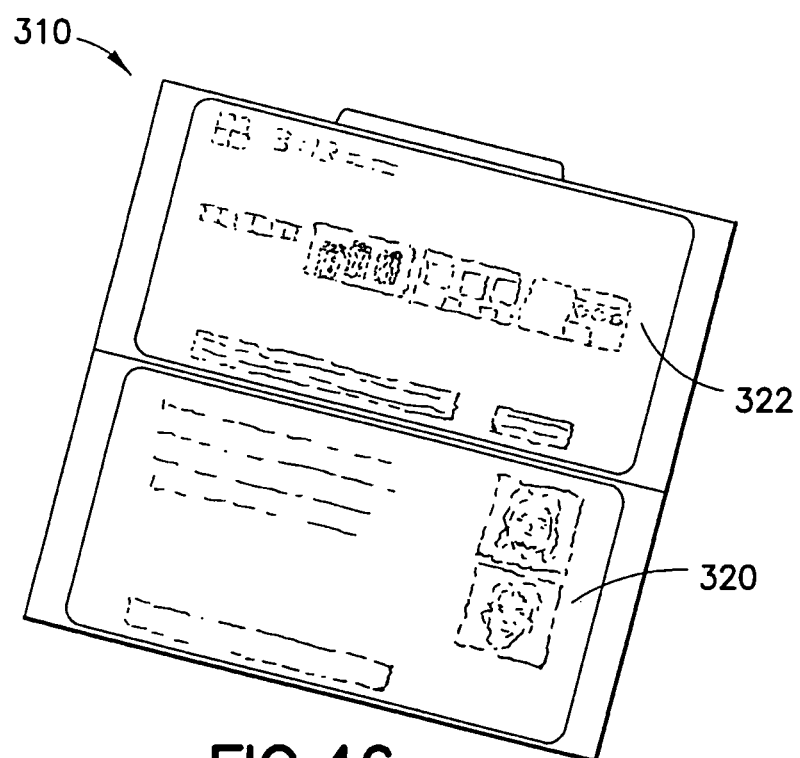

It should further be noted that the device 310 may comprise any suitable type of user interface(s). For example, as shown in FIGS. 42, 44, a "browser" type of user interface is provided at the displays 320, 322. In another example, as shown in FIGS. 45, 46, a "home screen" type of user interface is provided at the displays 320, 322. In yet another example, as shown in FIGS. 26, 27, 29, a "virtual QWERTY plus home screen" type of user interface is provided at the displays 320, 322. In this example, the virtual QWERTY at the display comprises a touch screen display. However, in alternate embodiments, any suitable type or combination of user interfaces may be provided.

FIG. 47 illustrates a method 400. The method 400 includes providing a housing having a first housing section and a second housing section (at block 402). Connecting a hinge assembly between the first housing section and the second housing section, wherein the hinge assembly comprises a first hinge member and a second hinge member (at block 404). Connecting a first slide mechanism between the first hinge member and first housing section (at block 406). Connecting a second slide mechanism between the second hinge member and the second housing section (at block 408). It should be noted that the illustration of a particular order of the blocks does not necessarily imply that there is a required or preferred order for the blocks and the order and arrangement of the blocks may be varied. Furthermore it may be possible for some blocks to be omitted.

Figure 48:
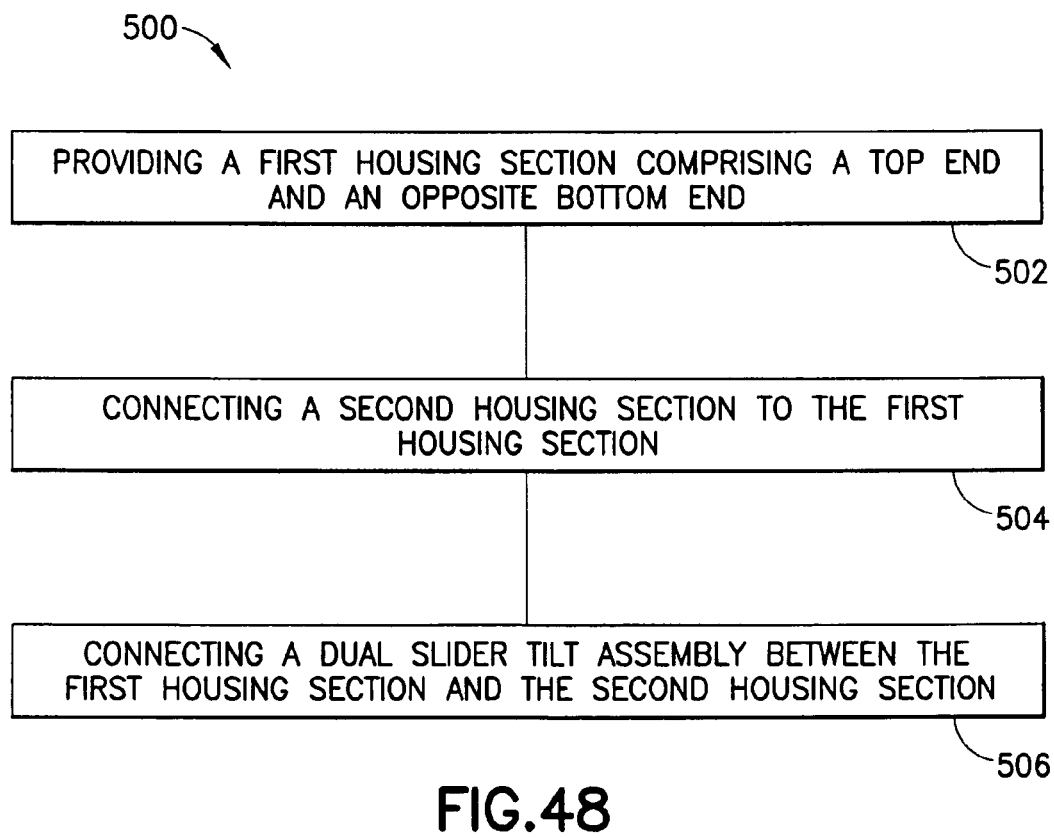
FIG. 48 is a block diagram of another exemplary method incorporating features of the invention.

FIG. 48 illustrates a method 500. The method 500 includes providing a first housing section comprising a top end and an opposite bottom end (at block 502). Connecting a second housing section to the first housing section, wherein the second housing section comprises a top end and an opposite end (at block 504). Connecting a dual slider tilt assembly between the first housing section and the second housing section, wherein the dual slider tilt assembly is configured to permit a substantially translational movement of the second housing section over the entire first housing section from a closed position to a fully extended position, wherein the bottom end of the second housing section is spaced from the top end of the first housing section in the direction of the substantially translational movement when the second housing section is at the fully extended position, and wherein the dual slider tilt assembly is configured to permit tilting the second housing section towards the first housing section when the second housing section is at the fully extended position (at block 506). It should be noted that the illustration of a particular order of the blocks does not necessarily imply that there is a required or preferred order for the blocks and the order and arrangement of the blocks may be varied. Furthermore it may be possible for some blocks to be omitted.

While various exemplary embodiments of the invention have been described in connection with a double slider communicator with a tilting display wherein a side slider with a slider plate enables a wide opening of the device such that the two housing sections of the device are at substantially the same level, one skilled in the art will appreciate that the various embodiments of the invention are not necessarily so limited and that various elements of the dual slide tilt assembly may be used for flip type mobile devices, and vertical slider configurations, as well.

Technical effects of any one or more of the exemplary embodiments provide a side slider device configuration which preferably reveals the whole lower block face (or lower housing section face) wherein the sliding mechanism allows for the upper block (or upper housing section) to be pushed outside/beyond the lower block (or lower housing section. Conventional devices with 'wide' sliders (which may include telescopic slider configurations, for example) comprise configurations wherein the housing sections are not able to slide, or move, entirely all the way across (or beyond) each other. This results in only a portion of one of the housing section surfaces available, and thus provides only limited space for 'QWERTY' style user input regions.

Some examples of the invention provide a device wherein various configurations are achievable by user manipulation of the housing sections, for example in one configuration/position the device may provide a closed mode, similar to a 'mono-block' style touch device. For example in another configuration/position the device may provide a first open mode, similar to a 'messenger' style device wherein a 'QWERTY' input region is accessible at the lower housing section. For example in yet another configuration/position the device may provide a second open mode, similar to a 'communicator' style device with full keypad is accessible at the lower housing section and further providing a tilted display.

Without in any way limiting the scope, interpretation, or application of the claims appearing below, a technical effect of one or more of the example embodiments disclosed herein is providing a substantially large 'QWERTY' user input region into a small device. Another technical effect of one or more of the example embodiments disclosed herein is providing a slide mechanism with a sliding plate which guides the upper housing section away from the lower housing section. Another technical effect of one or more of the example embodiments disclosed herein is providing a display capable of tilting to an optimal viewing angle (such as an adjustable display angle, for example). Another technical effect of one or more of the example embodiments disclosed herein is providing two slider mechanisms which allow for two open modes (or device positions). Another technical effect of one or more of the example embodiments disclosed herein is a mechanism allowing for a dual-display device (such as two 'full size' displays, for example) configuration. Another technical effect of one or more of the example embodiments disclosed herein is providing a configuration wherein the upper display is visible in a closed mode, and 'one hand' use is achievable in the closed mode. Another technical effect of one or more of the example embodiments disclosed herein is providing substantially a zero gap between housing blocks (or housing sections), wherein one or more spring(s) pull the housing blocks together. Another technical effect of one or more of the example embodiments disclosed herein is providing substantially a zero step between the housing sections (such as substantially a zero step between the edge [proximate the top end] of the upper face of the lower housing section and the edge [proximate the bottom end] of the upper face of the upper housing section) when the upper housing section is tilted toward the lower housing section. Another technical effect of one or more of the example embodiments disclosed herein is providing a simplistic yet robust configuration. Another technical effect of one or more of the example embodiments disclosed herein is providing for a two step movement between the different open positions (which may be beneficial for a virtual QWERTY configuration, for example). Another technical effect of one or more of the example embodiments disclosed herein is that the movable slider components may give some support in table usage, and allow for hiding the camera (such as when not in a camera mode, for example).

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to one example of the invention, an apparatus is disclosed. The apparatus includes a housing, a first hinge member, and a second hinge member. The housing comprises a first housing section and a second housing section. The first hinge member is connected to the first housing section by a first slide mechanism. The second hinge member comprises a first portion and a second portion. The first portion is connected to the first hinge member. The second portion is connected to the second housing section by a second slide mechanism.

According to another example of the invention, an apparatus is disclosed. The apparatus includes a first housing, a second housing, and a dual slide tilt assembly. The first housing section comprises a top end and an opposite bottom end. The second housing section is connected to the first housing section. The second housing section comprises a top end and an opposite bottom end. The dual slider tilt assembly is connected between the first housing section and the second housing section. The dual slider tilt assembly is configured to permit a substantially translational movement of the second housing section over the entire first housing section from a closed position to a fully extended position. The bottom end of the second housing section is spaced from the top end of the first housing section in the direction of the substantially translational movement when the second housing section is at the fully extended position. The dual slider tilt assembly is configured to permit tilting the second housing section towards the first housing section when the second housing section is at the fully extended position.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a housing comprising a first housing section and a second housing section;
   a first hinge member connected to the first housing section by a first slide mechanism, wherein a first end of the first hinge member is at an outer back face of the first housing section, and wherein a second end of the first hinge member is at an outer top end of the first housing section when the apparatus is in a closed position; and
   a second hinge member comprising a first portion and a second portion, wherein the first portion is connected to the first hinge member, and wherein the second portion is connected to the second housing section by a second slide mechanism;
   wherein when the apparatus is in a tilted position there is substantially no gap and substantially no step between upper surfaces of the first housing section and the second housing section.

2. An apparatus as in claim 1 wherein the first housing section comprises a first face opposite the outer back face, wherein the first face of the first housing section comprises a first display, and wherein the first hinge member extends over at least a portion of the outer back face of the first housing section when the apparatus is in the closed position and when the apparatus is in the tilted position.

3. An apparatus as in claim 1 wherein the second housing section comprises a first face and an opposite second face, wherein the first face of the second housing section comprises a second display, and wherein the second hinge member extends over at least a portion of the second face of the second housing section.

4. An apparatus as in claim 1 wherein the first hinge member is movably connected to the first housing section, and wherein the second hinge member is movably connected to the second housing section.

5. An apparatus as in claim 1 wherein the hinge members and the slide mechanisms are configured to permit the second housing section to tilt towards the first housing section when the apparatus is in a fully open position.

6. An apparatus as in claim 1 wherein a top end of the first housing section is spaced from a bottom end of the second housing section when the apparatus is in a closed position, and wherein the top end of the first housing section is in contact with the bottom end of the second housing section when the apparatus is in a tilted position.

7. An apparatus as in claim 1 wherein the apparatus comprises a mobile phone.

8. An apparatus as in claim 1 wherein the first housing section comprises a lower face having a curved surface.

9. An apparatus as in claim 1 wherein the hinge members and the slide mechanisms are configured to permit a substantially translational movement of the second housing section over the entire first housing section from a closed position to a fully extended position, wherein a bottom end of the second housing section is spaced from a top end of the first housing section in the direction of the substantially translational movement when the second housing section is at the fully extended position, and wherein a dual slider tilt assembly is configured to permit tilting the second housing section towards the first housing section when the second housing section is at the fully extended position.

10. An apparatus, comprising:
    a first housing section comprising a top end, a back face, and an opposite bottom end;
    a second housing section connected to the first housing section, wherein the second housing section comprises a top end and an opposite bottom end; and
    a dual slider tilt assembly connected between the first housing section and the second housing section, wherein the dual slider tilt assembly is configured to permit a substantially translational movement of the second housing section over the entire first housing section from a closed position to a fully extended position, wherein the bottom end of the second housing section is spaced from the top end of the first housing section in the direction of the substantially translational movement when the second housing section is at the fully extended position, and wherein the dual slider tilt assembly is configured to permit tilting the second housing section towards the first housing section when the second housing section is at the fully extended position, wherein a end portion of the dual slider tilt assembly is at the outer back face of the first housing section, and wherein another end portion of the dual slider tilt assembly is at the top end of the first housing section when the apparatus is in the closed position.

11. An apparatus as in claim 10 wherein the dual slider tilt assembly comprises a first hinge member, a second hinge member, a first slide mechanism, and a second slide mechanism, wherein the first hinge member is pivotably connected to the second hinge member, wherein the first slide mechanism is connected between the first hinge member and the first housing section, and wherein the second slide mechanism is connected between the second hinge member and the second housing section.

12. An apparatus as in claim 10 wherein the first housing section comprises an upper face and an opposite lower face, wherein the second housing section comprises an upper face and an opposite lower face, and wherein the dual slider tilt assembly is connected between the lower face of the first housing section and the lower face of the second housing section.

13. An apparatus as in claim 10 wherein the substantially translational movement of the second housing section over the first housing section comprises a sliding movement.

14. An apparatus as in claim 10 wherein the first housing section comprises a first display, and wherein the second housing section comprises a second display.

15. An apparatus as in claim 14 wherein the first display forms a majority of an upper face of the first housing section, and wherein the entire first display is visible when the apparatus is in a tilted position.

16. An apparatus as in claim 10 wherein when the apparatus is in a tilted position there is substantially no gap and substantially no step between upper surfaces of the first housing section and the second housing section.

17. A method, comprising:
providing a housing having a first housing section and a second housing section;
connecting a hinge assembly between the first housing section and the second housing section, wherein the hinge assembly comprises a first hinge member and a second hinge member, wherein a first end of the first hinge member is at an outer back face of the first housing section, and wherein a second end of the first hinge member is at an outer top end of the first housing section when the apparatus is in a closed position;
connecting a first slide mechanism between the first hinge member and first housing section; and
connecting a second slide mechanism between the second hinge member and the second housing section;
wherein when the housing is in a tilted position there is substantially no gap and substantially no step between upper surfaces of the first housing section and the second housing section.

18. A method as in claim 17 wherein the connecting of the hinge assembly between the first housing section and the second housing section further comprises pivotably connecting the first hinge member to the second hinge member.

19. A method as in claim 17 wherein the first housing section comprises a first display, wherein the second housing section comprises a second display, wherein the second housing section is over the first display when the housing is in a first position, and wherein the second display is adjacent the first display when the housing is in a second different position.

20. A method as in claim 17 wherein the hinge assembly, the first slide mechanism, and the second slide mechanism form a dual slider tilt assembly between the first housing section and the second housing section, wherein the dual slider tilt assembly is configured to permit a substantially translational movement of the second housing section over the entire first housing section from a closed position to a fully extended position, wherein the bottom end of the second housing section is spaced from the top end of the first housing section in the direction of the substantially translational movement when the second housing section is at the fully extended position, and wherein the dual slider tilt assembly is configured to permit tilting the second housing section towards the first housing section when the second housing section is at the fully extended position.

* * * * *